(12) United States Patent
Huemiller et al.

(10) Patent No.: US 11,942,619 B2
(45) Date of Patent: Mar. 26, 2024

(54) METHOD OF FABRICATING AN ELECTRODE FOR AN ELECTROCHEMICAL CELL

(71) Applicant: GM GLOBAL TECHNOLOGY OPERATIONS LLC, Detroit, MI (US)

(72) Inventors: Erik Damon Huemiller, Waterford, MI (US); Shaomao Xu, Sterling Heights, MI (US); Ryan Curtis Sekol, Grosse Pointe Woods, MI (US); Wayne Cai, Troy, MI (US); Michael P. Balogh, Novi, MI (US); Xiaowei Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 17/725,117

(22) Filed: Apr. 20, 2022

(65) Prior Publication Data
US 2023/0343917 A1    Oct. 26, 2023

(51) Int. Cl.
*H01M 4/04* (2006.01)
*H01M 4/38* (2006.01)
*H01M 4/02* (2006.01)

(52) U.S. Cl.
CPC ....... *H01M 4/0404* (2013.01); *H01M 4/0409* (2013.01); *H01M 4/382* (2013.01); *H01M 2004/021* (2013.01)

(58) Field of Classification Search
CPC ........ H01M 4/0404; H01M 4/00; H01M 4/02; H01M 4/382; H01M 4/134; H01M 10/052; C23C 6/00
See application file for complete search history.

(56) References Cited

U.S. PATENT DOCUMENTS

| | | | |
|---|---|---|---|
| 2022/0267886 A1* | 8/2022 | Balogh | H01M 4/382 |
| 2022/0271264 A1* | 8/2022 | Xu | H01M 4/134 |

\* cited by examiner

*Primary Examiner* — Tabassom Tadayyon Eslami
(74) *Attorney, Agent, or Firm* — Harness, Dickey & Pierce, P.L.C.

(57) ABSTRACT

In various aspects, the present disclosure provides a method of manufacturing an electrode for an electrochemical cell. The method includes contacting a solid electrode material and a substrate at an interface. The method further includes preparing a liquid electrode material at the interface by heating at least a portion of the solid electrode material to a first temperature. The first temperature is greater than or equal to a melting point of the solid electrode material. The method further includes creating a layer of the liquid electrode material on the substrate by moving at least one of the solid electrode material and the substrate with respect to the other of the solid electrode material and the substrate. The method further includes forming the electrode by cooling the liquid electrode material to a second temperature. The second temperature is less than or equal to the melting point.

19 Claims, 14 Drawing Sheets

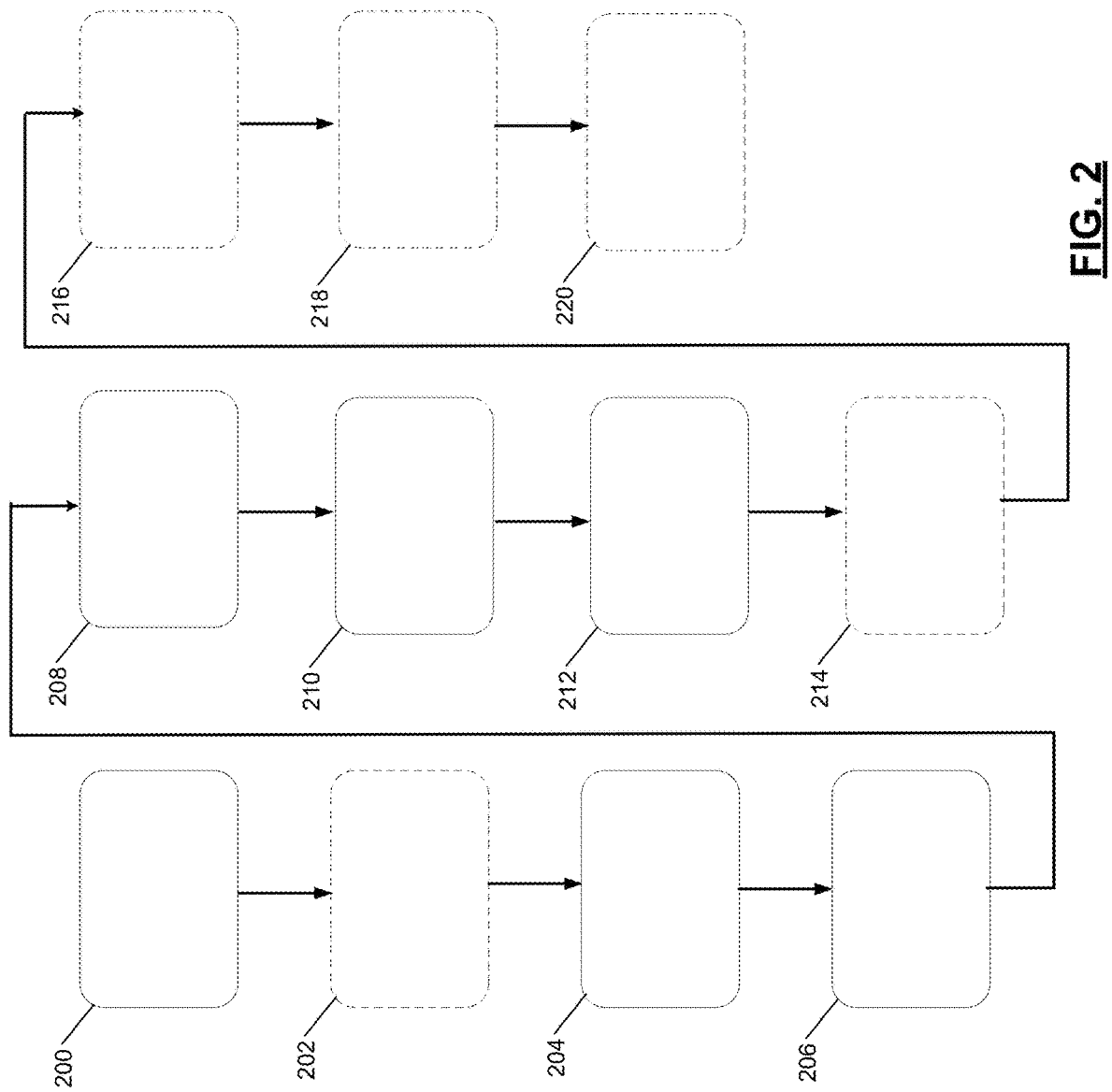

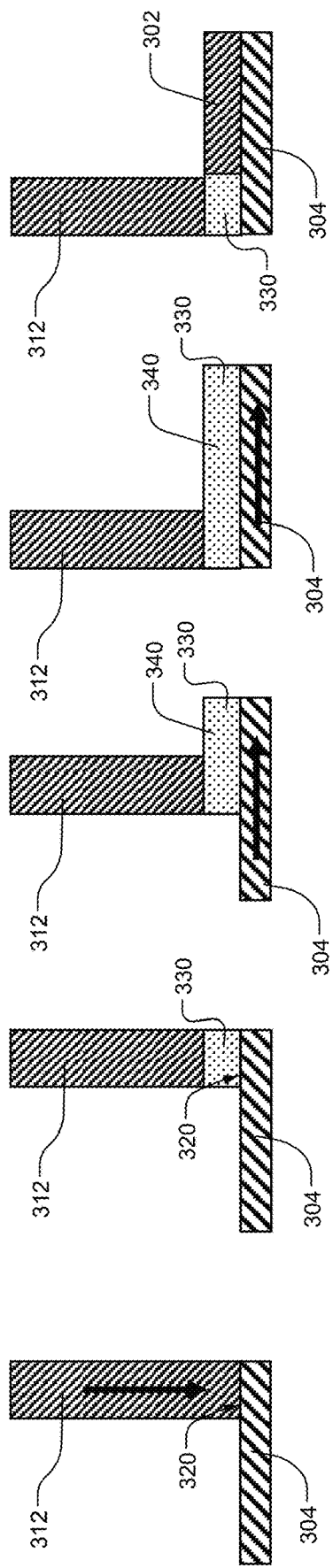

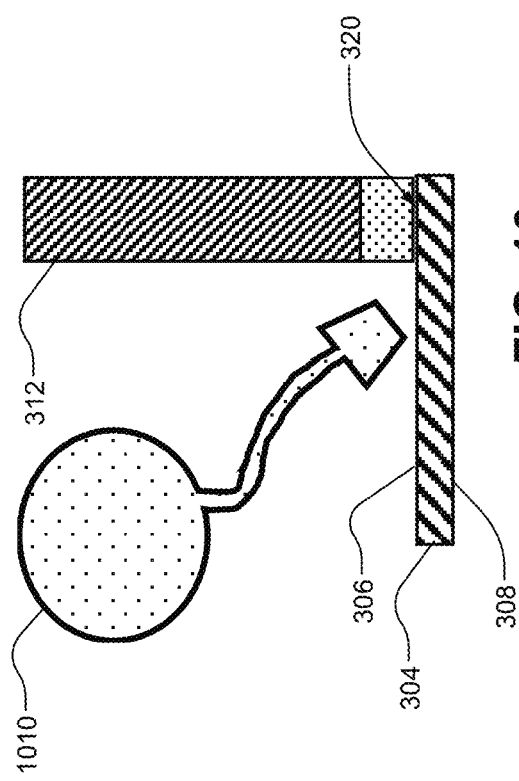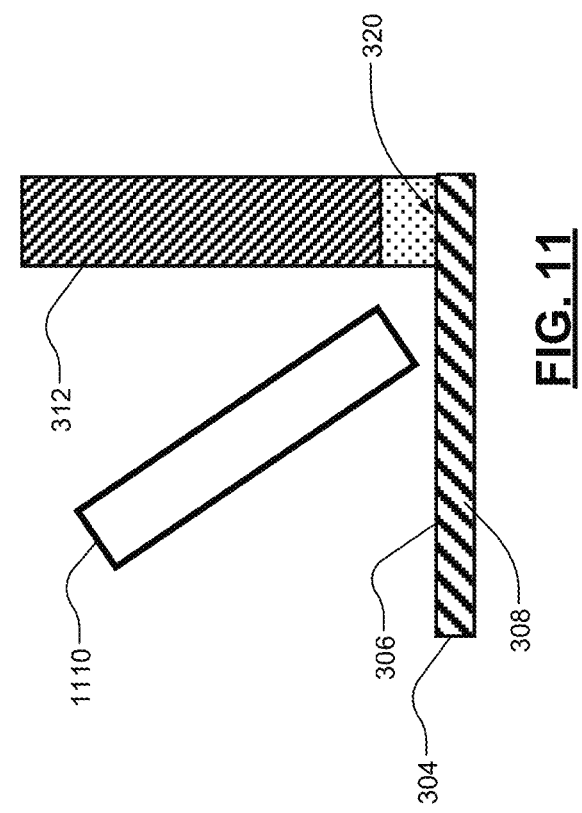

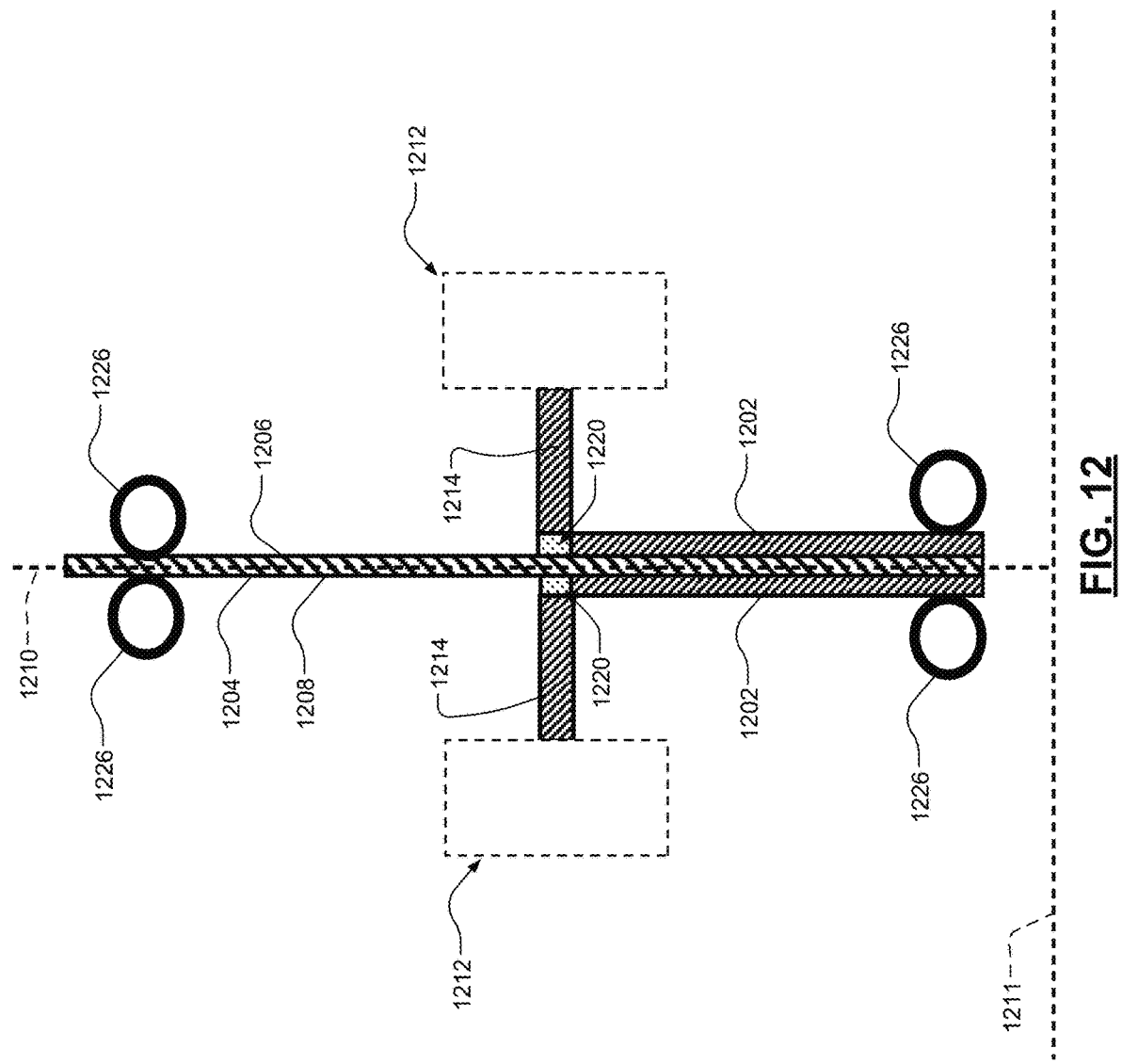

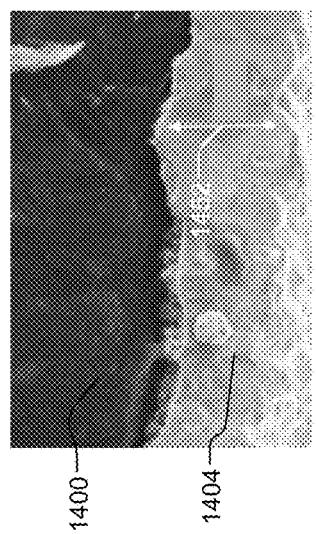
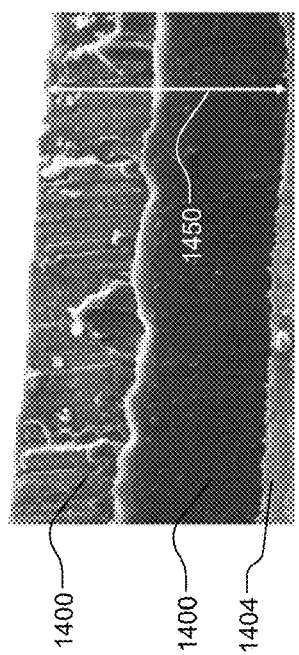
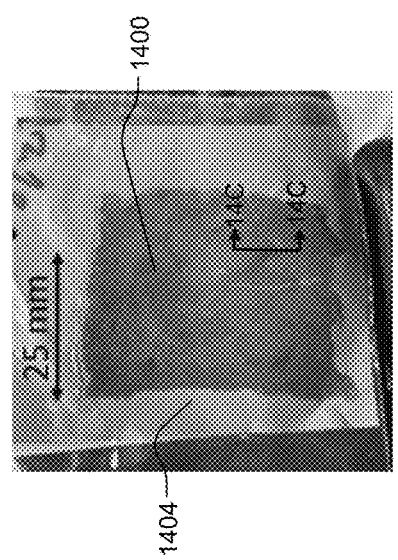
FIG. 14D
FIG. 14C
FIG. 14B

METHOD OF FABRICATING AN ELECTRODE FOR AN ELECTROCHEMICAL CELL

INTRODUCTION

The present disclosure relates to methods of manufacturing an electrode for an electrochemical cell.

High-energy density electrochemical cells, such as lithium-ion batteries can be used in a variety of consumer products and vehicles, such as hybrid or electric vehicles. Battery powered vehicles show promise as a transportation option as technical advances continue to be made in battery power and lifetimes. Batteries may include components formed from or including solid electrode material.

SUMMARY

This section provides a general summary of the disclosure and is not a comprehensive disclosure of its full scope or all of its features.

In various aspects, the present disclosure provides a method of manufacturing an electrode for an electrochemical cell. The method includes contacting a solid electrode material and a substrate at an interface. The method further includes preparing a liquid electrode material at the interface by heating at least a portion of the solid electrode material to a first temperature. The first temperature is greater than or equal to a melting point of the solid electrode material. The method further includes creating a layer of the liquid electrode material on the substrate by moving at least one of the solid electrode material and the substrate with respect to the other of the solid electrode material and the substrate. The method further includes forming the electrode by cooling the liquid electrode material to a second temperature. The second temperature is less than or equal to the melting point.

In one aspect, the solid electrode material includes lithium.

In one aspect, the solid electrode material is a lithium metal electrode.

In one aspect, the method further includes, prior to the contacting, providing the solid electrode material.

In one aspect, the providing includes unfurling the solid electrode material from a roll, extruding the solid electrode material, providing a powder including the solid electrode material, or combinations thereof.

In one aspect, the providing includes preparing the solid electrode material by combining a first precursor and a second precursor.

In one aspect, the heating includes directly heating the solid electrode material.

In one aspect, the heating includes directly heating the substrate prior to or during the contacting.

In one aspect, the crating includes translating the substrate with respect to the solid electrode material via a pair of rollers.

In one aspect, the method further includes separating at least a portion of the electrode from the substrate.

In one aspect, the substrate includes an electrically-conductive material configured to be a current collector or an electrically-insulating material configured to be a solid-state electrolyte.

In one aspect, the substrate includes an electroactive material, and the forming creates a precursor for pre-lithiation of the electroactive material.

In one aspect, the contacting includes contacting a first electrode material and the substrate at a first interface and contacting a second electrode material and the substrate at a second interface. The substrate is at least partially disposed between the first electrode material and the second electrode material.

In one aspect, the method further includes, after the forming, disposing an interleaf layer on the surface of the electrode.

In one aspect, the electrode has an average thickness that is greater than or equal to about 10 micrometers to less than or equal to about 30 micrometers.

In one aspect, the first temperature is greater than or equal to about 240° C. The second temperature is greater than or equal to about 25° C. to less than or equal to about 180° C.

In one aspect, the heating includes hot rolling, infrared (IR) radiating, providing hot argon gas, laser irradiating, resistance heating, or combinations thereof.

In one aspect, the method further includes, prior to the contacting, treating the substrate. The treating includes cleaning, laser ablating, providing a gas, acid washing, thermal treating, depositing wetting material, or combinations thereof.

In one aspect, the method further includes, after the forming, treating a surface of the electrode. The treating includes providing a cover gas, laser treating, rolling, or combinations thereof.

In various aspects, the present disclosure provides a method of manufacturing a lithium metal electrode. The method includes contacting a solid electrode material and a substrate at an interface. The method further includes preparing a liquid electrode material at the interface by heating at least a portion of the solid electrode material to a first temperature. The first temperature is greater than or equal to a melting point of the solid electrode material. The method further includes creating a layer of the liquid electrode material on the substrate by moving at least one of the solid electrode material and the substrate with respect to the other of the solid electrode material and the substrate. The method further includes forming the electrode by cooling the liquid electrode material to a second temperature. The second temperature is less than or equal to the melting point.

BRIEF DESCRIPTION OF THE DRAWINGS

The drawings described herein are for illustrative purposes only of selected embodiments and not all possible implementations and are not intended to limit the scope of the present disclosure.

FIG. 2 is a flowchart depicting a method of making an electrode for an electrochemical cell according to various aspects of the present disclosure;

FIGS. 3A-3F. FIG. 3A is a schematic illustration of an apparatus for manufacturing an electrode according to the method of FIG. 2. FIGS. 3B-3F are partial schematic views of the apparatus of FIG. 3A; FIG. 3B depicts the apparatus contact a solid electrode material and a substrate at an interface; FIG. 3C depicts the apparatus preparing a liquid electrode material at the interface; FIGS. 3D-3E depict creating a layer of the liquid electrode material; and FIG. 3F depicts forming the electrode by cooling the liquid electrode material;

FIG. 10 is a partial schematic illustration the apparatus of FIG. 3A including another heating station according to various aspects of the present disclosure;

FIG. 11 is a partial schematic illustration the apparatus of FIG. 3A including another heating station according to various aspects of the present disclosure;

FIG. 12 is another schematic illustration of an alternative apparatus for manufacturing an electrode according to the method of FIG. 2;

FIGS. 14A-14D. FIGS. 14A-14B relate to an electrode prepared according to various aspects of the present disclosure. FIG. 14A is a schematic illustration of a setup for making the electrode. FIG. 14B is a photograph of an electrode prepared using the setup of FIG. 14A. FIG. 14C is a scanning electron microscope ("SEM") photograph of a cross-section of a portion of the electrode of FIG. 14B taken at line 14C-14C of FIG. 14B. FIG. 14D is another SEM photograph of the cross-section of FIG. 14C according to various aspects of the present disclosure.

In the drawings, reference numbers may be reused to identify similar and/or identical elements.

DETAILED DESCRIPTION

Figure 1:
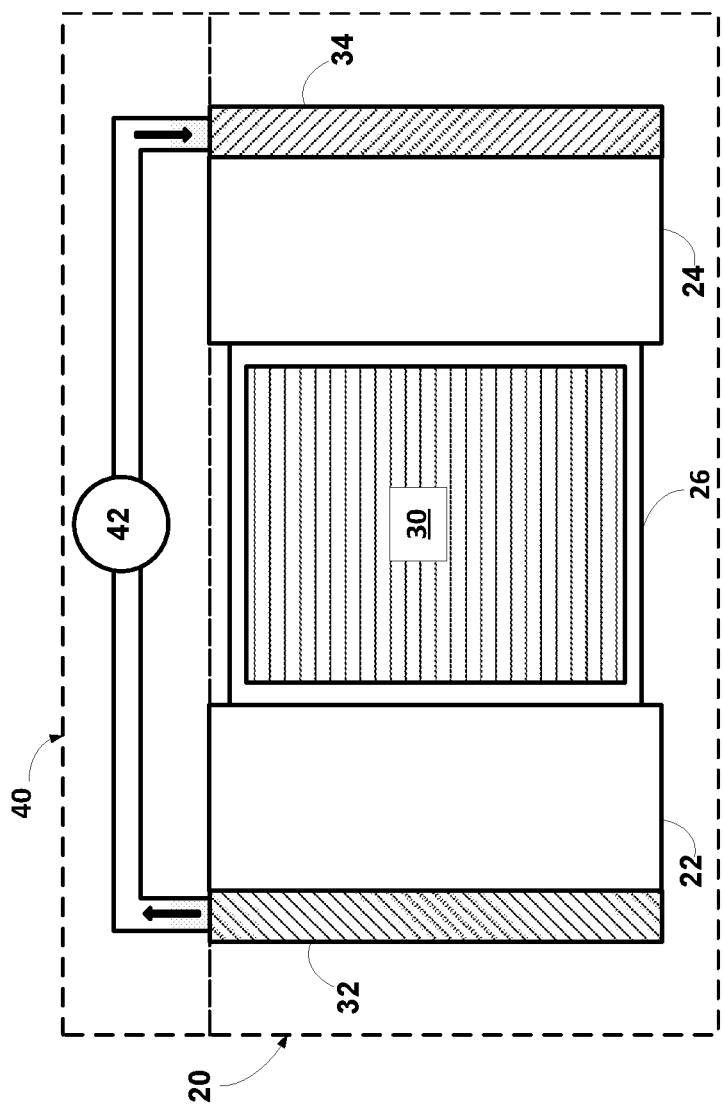
FIG. 1 is a schematic illustration of an electrochemical battery cell for cycling lithium ions.

Example embodiments are provided so that this disclosure will be thorough and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices or energy storage systems (ESS).

General Electrochemical Cell Function, Structure, and Composition

A typical electrochemical cell includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery, and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

An exemplary schematic illustration of an electrochemical cell, such as a lithium-ion battery 20, is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides, as is known in the art. In certain aspects, the current collectors may be coated with an electroactive material/electrode layer on both sides. The negative electrode current collector 32 and positive electrode current collector 34 respectively collect and move free electrons to and from an external circuit 40. The interruptible external circuit 40 includes a load device 42 connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes one or more lithium salts dissolved in an organic solvent or a mixture of organic solvents. Numerous conventional non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Non-limiting examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis (trifluoromethanesulfonimide) (LITFSI) ($LiN(CF_3SO_2)_2$); lithium fluorosulfonylimide ($LiN(FSO_2)_2$) (LIFSI); and combinations thereof. In certain variations, the electrolyte 30 may include a 1 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol) dimethyl ether), 1,3-dimethoxypropane (DMP), and combinations thereof. Carbonate-based solvents may include various alkyl carbonates, such as cyclic carbonates (e.g., ethylene carbonate (EC), propylene carbonate (PC), butylene carbonate) and acyclic carbonates (e.g., dimethyl carbonate (DMC), diethyl carbonate (DEC), ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF— hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, DE)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

Solid-State Electrolyte

In certain aspects, the electrolyte 30 is a solid-state electrolyte ("SSE"). In certain aspects, the porous separator 26 and the electrolyte 30 may be replaced with a SSE that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of non-limiting example, SSEs may include a polymer, a solid-state ceramic, a glass, and/or a glass ceramic. In certain aspects, such as when the solid-state electrolyte includes a polymer, the solid-state electrolyte may include polyethylene oxide (PEO). In certain aspects, such as when the solid-state electrolyte includes a solid-state ceramic, a glass, and/or a glass ceramic, the solid-state electrolyte may include a composition selected from the group consisting of: lithium titanium phosphate ($LiTi_2(PO_4)_3$) (LTP), lithium germanium phosphate ($LiGe_2(PO_4)_3$) (LGP), lithium lanthanum titanate ($Li_3xLa_{2/3}$-$xTiO_3$) (LLTO), lithium phosphate ($Li_3PO_4$), lithium nitride ($Li_3N$), lithium aluminum titanium phosphate ($Li_{1.3}Al_{0.3}Ti_{1.7}(PO_4)_3$) (LATP), lithium lanthanum zirconium oxide ($Li_7La_3Zr_2O_{12}$) (LLZO), lithium phosphorous sulfide ($70Li_2S$-$30P_2S_5$) (LPS), $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or any combination thereof.

Positive Electrode

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

Two exemplary common classes of known electroactive materials that can be used to form the positive electrode 24 are lithium transition metal oxides with layered structures and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically <0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide (Li($Ni_xMn_yCo_z$)$O_2$), where $0 \le x \le 1$, $0 \le y \le 1$, $0 \le z \le 1$, and x+y+z=1 (e.g., $LiNi_{0.6}Mn_{0.2}Co_{0.2}O_2$, $LiNi_{0.7}Mn_{0.2}Co_{0.1}O_2$, $LiNi_{0.8}Mn_{0.1}Co_{0.1}O_2$, and/or $LiMn_{0.33}Ni_{0.33}Co_{0.33}O_2$), a lithium nickel cobalt metal oxide ($LiNi_{(1-x-y)}Co_xM_yO_2$), where $0<x<1$, $0<y<1$ and M may be Al, Mg, Mn, or the like. Other known lithium-transition metal compounds such as lithium iron phosphate ($LiFePO_4$), lithium iron fluorophosphate ($Li_2FePO_4F$), or lithium Manganese iron phosphate ($LiMnFePO_4$) can also be used. In certain aspects, the positive electrode 24 may include an electroactive material that includes manganese, such as lithium manganese oxide ($Li_{(1+x)}Mn_{(2-x)}O_4$), and/or a mixed lithium manganese nickel oxide ($LiMn_{(2-x)}Ni_xO_4$), where $0 \le x \le 1$. In a lithium-sulfur battery, positive electrodes may have elemental sulfur as the active material or a sulfur-containing active material.

The positive electroactive materials may be powder compositions. The positive electroactive materials may be intermingled with an optional electrically conductive material (e.g., electrically-conductive particles) and a polymeric binder. The binder may both hold together the positive electroactive material and provide ionic conductivity to the positive electrode 24. The polymeric binder may include polyvinylidene fluoride (PVdF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, or a combination thereof.

The positive electroactive material loading in the binder can be large, such as greater than about 80% by weight. For example, the binder can be present at a level of greater than or equal to about 1% by weight to less than or equal to about 20% by weight, optionally greater than or equal to about 1% by weight to less than or equal to about 10% by weight, optionally greater than or equal to about 1% to less than or equal to about 8% by weight, optionally greater than or equal to about 1% by weight to less than or equal to about 6% by weight, optionally greater than or equal to about 1% by weight to less than or equal to about 7% by weight, optionally greater than or equal to about 1% by weight to less than or equal to about 5% by weight, or optionally greater than or equal to about 1% by weight to less than or equal to about 3% by weight.

Electrically conductive materials may include graphite, other carbon-based materials, conductive metals, or conductive polymer particles. Carbon-based materials may include, by way of non-limiting example, particles of KETJEN® black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15% by weight, optionally less than or equal to about 10% by weight, or optionally greater than or equal to about 0.5% by weight to less than or equal to about 8% by weight. While the supplemental electrically conductive compositions may be described as powders, these materials lose their powder character following incorporation into the electrode where the associated particles of the supplemental electrically conductive material become a component of the resulting electrode structure.

Negative Electrode

The negative electrode 22 may include a negative electroactive material as a lithium host material capable of functioning as a negative terminal of the lithium-ion battery 20. Common negative electroactive materials include lithium insertion materials or alloy host materials. Such materials can include carbon-based materials, such as lithium-graphite intercalation compounds, lithium-silicon compounds, lithium-tin alloys, or lithium titanate $Li_{4+x}Ti_5O_{12}$, where $0 \leq x \leq 3$, such as $Li_4Ti_5O_{12}$ (LTO).

In certain aspects, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material selected from the group consisting of: polyvinylidene difluoride (PVdF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETJEN® black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode 22 may include about 50-100% by weight of an electroactive material (e.g., lithium particles or a lithium foil), optionally greater than or equal to about 30% by weight of an electrically conductive material, and a balance binder.

Optional Electrode Surface Coatings

In certain variations, pre-fabricated negative electrodes 22 and positive electrodes 24 can be directly coated via a vapor coating formation process to form a conformal inorganic-organic composite surface coating, as described further below. Thus, one or more exposed regions of the pre-fabricated negative electrodes including the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles including an electroactive material, like lithium metal, can be coated with an inorganic-organic composite surface coating. Then, the coated electroactive particles can be used in the active material slurry to form the negative electrode, as described above.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of non-limiting example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Method of Fabricating an Electrode

In various aspects, the present disclosure provides a method of fabricating an electrode for an electrochemical cell. The method generally includes contacting a solid electrode material and a substrate at an interface, preparing a liquid electrode material at the interface by heating portion of the solid electrode material, creating a layer of the liquid electrode material on the substrate by moving (e.g., translating) at least one of the solid electrode material and the substrate with respect to the other of the solid electrode material and the substrate, and forming the electrode by cooling the liquid electrode material. In certain aspects, prior to contacting the solid electrode material and the substrate, the method further includes treating a surface of the substrate, such as to increase the adhesion of the electrode and the substrate. In certain aspects, after or concurrently with forming the electrode, the method further includes treating the electrode to achieve desired characteristics, such as to increase adhesion of the electrode and other components of the electrochemical cell and/or modify a thickness and/or a surface roughness of the electrode. Methods according to various aspects of the present disclosure may facilitate the preparation of thin electrodes (e.g., electrodes having thicknesses less than or equal to about 100 µm) at high production rates. In certain aspects, the electrode thickness may be affected by heating rate, heating temperature, cooling rate, cooling temperature, and/or relative speed of the substrate and solid electrode material.

With reference to FIG. 2, a method of fabricating an electrode according to various aspects of the present disclosure is provided. The method generally includes providing a substrate at 200; optionally treating the substrate at 202; providing a solid electrode material at 204; contacting the solid electrode material and the substrate at an interface at 206; preparing a liquid electrode material at the interface by heating at least a portion of the solid electrode material at 208; creating a layer of the liquid electrode material on the substrate at 210; forming the electrode by cooling the liquid electrode material at 212; optionally treating the electrode at 214; optionally adding a discrete layer (e.g., an interleaf layer) adjacent to the electrode at 216; optionally removing at least a portion of the substrate from the electrode at 218; and optionally assembling an electrochemical cell including the electrode at 220. In certain aspects, the method according to various aspects of the present disclosure may include different steps, additional steps, a combination of a portion of the steps, such as 206, 208, 210, and 212. Moreover, the steps may be performed in the order described above or a different order. The steps may be performed sequentially, concurrently, or a combination of sequentially and concurrently. Each of the steps is described in further detail below.

With reference to FIG. 3, a schematic illustration of an apparatus for fabricating an electrode 302 according to various aspects of the present disclosure is provided.

Providing a Substrate

Figure 3A:
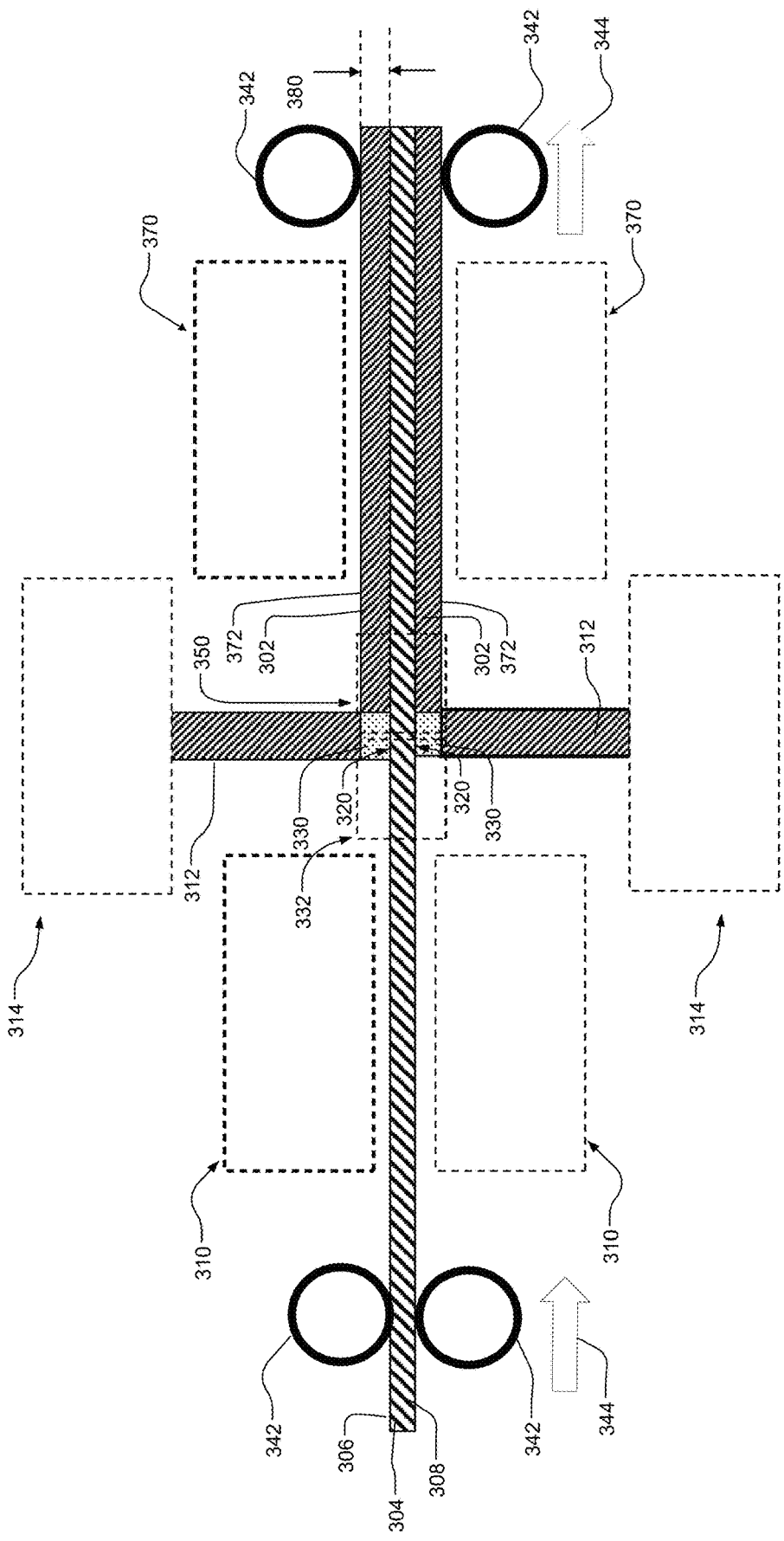

At 200 (FIG. 2), the method includes providing a substrate 304 (FIG. 3A). The substrate 304 includes a first or top surface 306 and a second or bottom surface 308 opposite the first surface 306 (also referred to as "the surfaces 306, 308"). In certain aspects, after formation of the electrode 302, the substrate 304 is configured to be separated from the electrode 302. In certain other aspects, the substrate 304 is configured to remain attached to the electrode 302 and become a part of an electrochemical cell (not shown) (see, e.g., the lithium-ion battery 20 of FIG. 1). For example, the substrate 304 may form all or a portion of a current collector or a solid-state electrolyte ("SSE") or a layer of an electrode, as discussed in greater detail below.

When the substrate 304 is configured to be removed from the electrode 302, the substrate 304 may be formed from any suitable material that retains its structural integrity (e.g., remains solid) at all temperatures to which it will be subjected during the method and is capable of being removed from the electrode 302 (if desired). In certain aspects, the substrate 304 may be in the form of a web (e.g., a polymer web). The substrate 304 may be formed from or include a polymer such as a poly (ether ether keytone) (PEEK), a polyethylene terephthalate (PET), a polyimide (PI) (e.g., Kapton), polyetherimide (PEI), co-polymers thereof, or combinations thereof, by way of example.

When the substrate 304 is configured to become a part of the electrochemical cell, the substrate 304 may include a material suitable for inclusion as all or a portion of a current collector or SSE, or a layer of an electrode. When the substrate 304 is configured to be a current collector, the substrate 304 is formed from electrically-conductive material. The electrically-conductive material may be a metal foil and/or a metal mesh, such as the materials described in the discussion of current collectors 32, 34 of FIG. 1, above. In certain aspects, the substrate 304 includes a copper foil.

In certain aspects, the substrate 304 includes the SSE. When the substrate 304 is configured to be an SSE, the substrate 304 may be formed from electrically-insulating material. The SSE may include a ceramic material (e.g., an oxide-based ceramic or a sulfide glass or glass-ceramic) or a polymeric material, such as those described in the discussion accompanying FIG. 1.

In certain aspects, the substrate 304 is configured to be a layer of an electrode, such as when the method of fabricating the electrode 302 includes forming a layered electrode. The electrode may include electroactive material such as the electroactive materials described in the discussion of electrodes 22, 24 of FIG. 1, above. In certain aspects, the substrate 304 is configured to be a electroactive material and the electrode 302 is configured to be a precursor for pre-lithiation of the electroactive material. In certain aspects, the substrate 304 is configured to be a negative electroactive material and the electrode 302 is configured to be a precursor for pre-lithiation of an anode. In certain aspects, the negative electroactive material includes silicon, as described in the discussion accompanying FIG. 1.

In certain aspects, the substrate 304 has an average thickness that is greater than or equal to about 5 microns (µm) to less than or equal to about 250 µm. In certain aspects, such as when the substrate 304 is configured to be removed from the electrode 302, the substrate 304 has an average thickness that is greater than or equal to about 5 µm to less than or equal to about 50 µm. In certain aspects, such as when the substrate 304 is configured to be a current collector, the substrate 304 has an average thickness that is greater than or equal to about 5 µm to less than or equal to about 15 µm. In certain aspects, such as when the substrate 304 is configured to be an SSE, the substrate 304 has an average thickness that is greater than or equal to about 80 µm to less than or equal to about 200 µm. In certain aspects, such as when the substrate 304 is configured to be an electrode or a layer of negative electroactive material, the substrate 304 has an average thickness that is greater than or equal to about 80 µm to less than or equal to about 200 µm.

In certain aspects, the substrate 304 has an average surface roughness that is greater than or equal to about 0.1 µm, optionally greater than or equal to about 1 µm, optionally greater than or equal to about 5 µm, optionally greater than or equal to about 10 µm, optionally greater than or equal to about 20 µm, optionally greater than or equal to about 30

μm, or optionally greater than or equal to about 40 μm. In certain aspects, the substrate 304 has an average surface roughness that is less than or equal to about 50 μm, optionally less than or equal to about 40 μm, optionally less than or equal to about 30 μm, optionally less than or equal to about 20 μm, optionally less than or equal to about 10 μm, optionally less than or equal to about 5 μm, or optionally less than or equal to about 1 μm.

Treating the Substrate

With continued reference to FIG. 3A, in certain aspects, at 202 (FIG. 2) the method optionally includes treating the substrate 304 at a treatment station or zone 310. Treating the substrate 304 at 202 may be performed sequentially after providing the substrate at 200 (FIG. 2) or concurrently with providing the substrate 304 at 200. Treating the substrate 304 may include physically and/or chemically modifying at least a portion of one or both of the surfaces 306, 308 of the substrate 304. The treated portion of the substrate 304 may include substantially the entire first surface 306 and/or second surface 308. In certain aspects, treating the substrate 304 may improve (e.g., increase) the adhesion between the electrode 302 and the substrate 304. In one example, such as when both the first surface 306 and the second surface 308 are in contact with the electrode 302, at least a portion of both of the surfaces 306, 308 are treated. In another example, such as when only one of the surfaces 306, 308 is in contact with the electrode 302, at least a portion of only one of the surfaces 306, 308 is treated (e.g., only one of the first surface 306 or the second surface 308 is treated). In certain aspects, treating the substrate 304 may include cleaning, laser ablating, contacting with a gas, acid washing, thermal treating, depositing wetting material, combinations thereof, or any other suitable treatment.

In certain aspects, treating the substrate 304 includes cleaning one or both of the surfaces 306, 308. The cleaning may reduce or eliminate debris (not shown) that may be present on one or both of the surfaces 306, 308. The cleaning may physically remove (e.g., by sweeping and/or brushing) debris that may be present on one or both of the surfaces 306, 308. Accordingly, after treating the substrate 304 at 202 (FIG. 2), the first surface 306 and/or the second surface 308 may be substantially free of debris. A substrate having a surface that is substantially free of debris and/or has reduced debris may facilitate improved/increased adhesion of the electrode 302 on the first surface 306 and/or the second surface 308 compared to a substrate having a surface having a relatively higher amount of debris. In certain aspects, the cleaning may include dry dusting (e.g., with pressurized air, with a fabric, and/or by sweeping), wet dusting (e.g., applying and wiping off a liquid, such as a cleaner), laser ablating (described in greater detail below), or combinations thereof.

In certain aspects, treating the substrate 304 includes laser ablation. In certain aspects, treating the substrate 304 includes directing a laser at one or both of the surfaces 306, 308. In certain aspects, the laser emits a laser beam. In certain aspects, the laser is a pulsed laser. In certain aspects, laser ablation facilitates the cleaning of the surfaces 306, 308 and/or increases a roughness of the surfaces 306, 308. In certain aspects, laser ablation may increase the adhesion of the electrode 302 on the surfaces 306, 308 by decreasing or eliminating debris on one or both of the surfaces 306, 308. In certain aspects, laser ablation may increase the roughness of the surfaces 306, 308. Accordingly, after treating the substrate 304 at 202 (FIG. 2), the first surface 306 and/or the second surface 308 may have an increased surface roughness. A substrate having a surface having increased surface roughness may facilitate improved/increased adhesion of the electrode 302 on the first surface 306 and/or the second surface 308 compared to a substrate having a surface having a relatively lower surface roughness.

In certain aspects, treating the substrate 304 includes directing a source of a gas toward one or both of the surfaces 306, 308 such that the gas contacts the surfaces 306, 308. The gas may include oxygen, or other suitable gases. In certain aspects, contacting one or both of the surfaces 306, 308 with the gas modifies the surface chemistry of the substrate 304. A substrate having a surface contacted by the gas may facilitate improved/increased adhesion of the electrode 302 on the first surface 306 and/or the second surface 308 compared to a substrate that was not treated by the gas. In certain aspects, the surface chemistry of the substrate 304 is tailored by the amount of gas and/or time of exposure to the gas. In certain aspects, such as when the gas is an oxygen gas, an oxide layer (not shown) forms on one or both of the surfaces 306, 308. In certain aspects, the surface chemistry of the substrate 304 is tailored by the composition and/or thickness of the oxide layer. For example, in one embodiment, a copper oxide layer may form on one or both of the surfaces 306, 308 when the substrate 304 is formed of copper and one or both of the surfaces 306, 308 is exposed to an oxygen gas. The copper oxide layer may facilitate improved/increased adhesion of the electrode 302 on the first surface 306 and/or the second surface 308 compared to a substrate that was not treated by the oxygen gas.

In certain aspects, treating the substrate 304 includes applying and removing an acid wash on one or both of the surfaces 306, 308. In certain aspects, the acid wash may chemically reduce or eliminate debris (not shown) and/or impurities that may be present on one or both of the surfaces 306, 308. In certain aspects, the acid wash contacts one or both of the surfaces 306, 308 and dissolves the debris and/or impurities. After the contacting, the acid may be removed from one or both of the surfaces 306, 308 (e.g., via wiping off the acid wash and/or rinsing one or both of the surface 306, 308). Accordingly, in certain aspects, after treating the substrate 304 with the acid wash, the first surface 306 and/or the second surface 308 may have reduced debris and/or impurities or be substantially free of debris and/or impurities. A substrate having a surface that is substantially free of debris or has reduced debris may facilitate improved (e.g., increased) adhesion of the electrode 302 on the first surface 306 and/or the second surface 308.

In certain aspects, treating the substrate 304 includes thermal treatment. In certain aspects, the thermal treatment facilitates chemical reactions on one or both of the surfaces 306, 308. In certain aspects, treating one or both of the surfaces 306, 308 with a thermal treatment accelerates and/or decreases the time of chemical reactions on one or both of the surfaces 306, 308. A substrate treated by the thermal treatment may facilitate improved/increased adhesion of the electrode 302 on the first surface 306 and/or the second surface 308 compared to a substrate that was not treated by thermal treatment.

In certain aspects, treating the substrate 304 includes contacting one or both of the surfaces 306, 308 with a wetting material. In certain aspects, the wetting material includes a zinc oxide, or other suitable wetting materials. In certain aspects, contacting includes depositing the wetting material on one or both of the surfaces 306, 308. In certain aspects, depositing includes vapor deposition techniques, such as atomic layer deposition ("ALD"), physical vapor deposition ("PVD"), and/or other suitable vapor deposition techniques. In certain aspects, a thin layer including the wetting material is formed by vapor deposition on one or both of the surfaces 306, 308 to promote surface wetting and/or adhesion of the electrode 302 to the surfaces 306, 308.

In certain aspects, the thin layer including the wetting material has an average thickness that is less than or equal to about 1 µm. The average thickness may be less than or equal to about 750 nm, optionally less than or equal to about 500 nm, optionally less than or equal to about 250 nm, optionally less than or equal to about 100 nm, or optionally less than or equal to about 50 nm.

In one example the depositing includes ALD. The thin layer including the wetting material may have an average thickness that is greater than or equal to about 1 nanometer (nm), optionally greater than or equal to about 5 nm, optionally greater than or equal to about 10 nm, optionally greater than or equal to about 50 nm, optionally greater than or equal to about 100 nm, optionally greater than or equal to about 200 nm, optionally greater than or equal to about 300 nm, or optionally greater than or equal to about 5 nm. The average thickness may be less than or equal to about 500 nm, optionally less than or equal to about 400 nm, optionally less than or equal to about 300 nm, optionally less than or equal to about 200 nm, optionally less than or equal to about 100 nm, optionally less than or equal to about 50 nm, optionally less than or equal to about 10 nm, or optionally less than or equal to about 5 nm.

In another example, the depositing includes PVD. The thin layer including the wetting material may have an average thickness that is greater than or equal to about 0.1 µm, optionally greater than or equal to about 0.5 µm, optionally greater than or equal to about 1 µm, optionally greater than or equal to about 2 µm, optionally greater than or equal to about 3 µm, or optionally greater than or equal to about 4 µm. The average thickness may be less than or equal to about 5 µm, optionally less than or equal to about 4 µm, optionally less than or equal to about 3 µm, optionally less than or equal to about 2 µm, optionally less than or equal to about 1 µm, or optionally less than or equal to about 0.5 µm.

Providing a Solid Electrode Material

In various aspects, at 204 (FIG. 2), the method includes providing a solid electrode material 312 within an electrode material station or zone 314. Providing the solid electrode material 312 at 204 may be performed after providing the substrate 304 at 200 (FIG. 2), before providing the substrate 304 at 200, or concurrently with providing the substrate 304 at 200. Providing the solid electrode material 312 at 204 may be performed after treating the substrate 304 at 202 (FIG. 2), before treating the substrate 304 at 202, or concurrently with treating the substrate 304 at 202. The solid electrode material 312 may include a material suitable for use as an electrode in an electrochemical cell, such as those described in the discussion of the electrodes 22, 24 in the discussion accompanying FIG. 1, above. In certain aspects, the solid electrode material 312 includes lithium. In certain aspects, the solid electrode material 312 includes a lithium alloy. In certain aspects, the solid electrode material consists essentially of lithium, such as when the solid electrode material 312 is used to form a lithium metal electrode for a lithium metal battery. In certain aspects, providing the solid electrode material at 204 includes preparing the solid electrode material. Preparing the solid electrode material may include combining a first precursor material and a second precursor material, as will be described in greater detail below in the discussion accompanying FIG. 7.

Although FIG. 3A shows formation of electrodes 302 on both of the surfaces 306, 308, in certain aspects, the method may include forming an electrode on only one of the surfaces 306, 308. In certain aspects, such as when the electrode 302 is formed on both of the surfaces 306, 308, the solid electrode material 312 is configured to contact the substrate 304 at the first surface 306 and at the second surface 308. In certain aspects, such as when the electrode 302 is formed on only one of the surfaces 306, 308, the solid electrode material 312 is configured to contact the substrate 304 at the first surface 306 or the second surface 308.

The solid electrode material 312 may be provided by different methods, which are described in greater detail below in the discussions accompanying FIGS. 4-7, or any other suitable method. The solid electrode material 312 may be provided substantially perpendicular to the substrate 304, as shown, or at any other suitable angle. Providing the solid electrode material 312 may include unfurling the solid electrode material from a roll (FIG. 4), providing a powder including the solid electrode material (FIG. 5), extruding the solid electrode material (FIG. 6), admixing a first precursor and a second precursor (FIG. 7), or combinations thereof.

Figure 4:
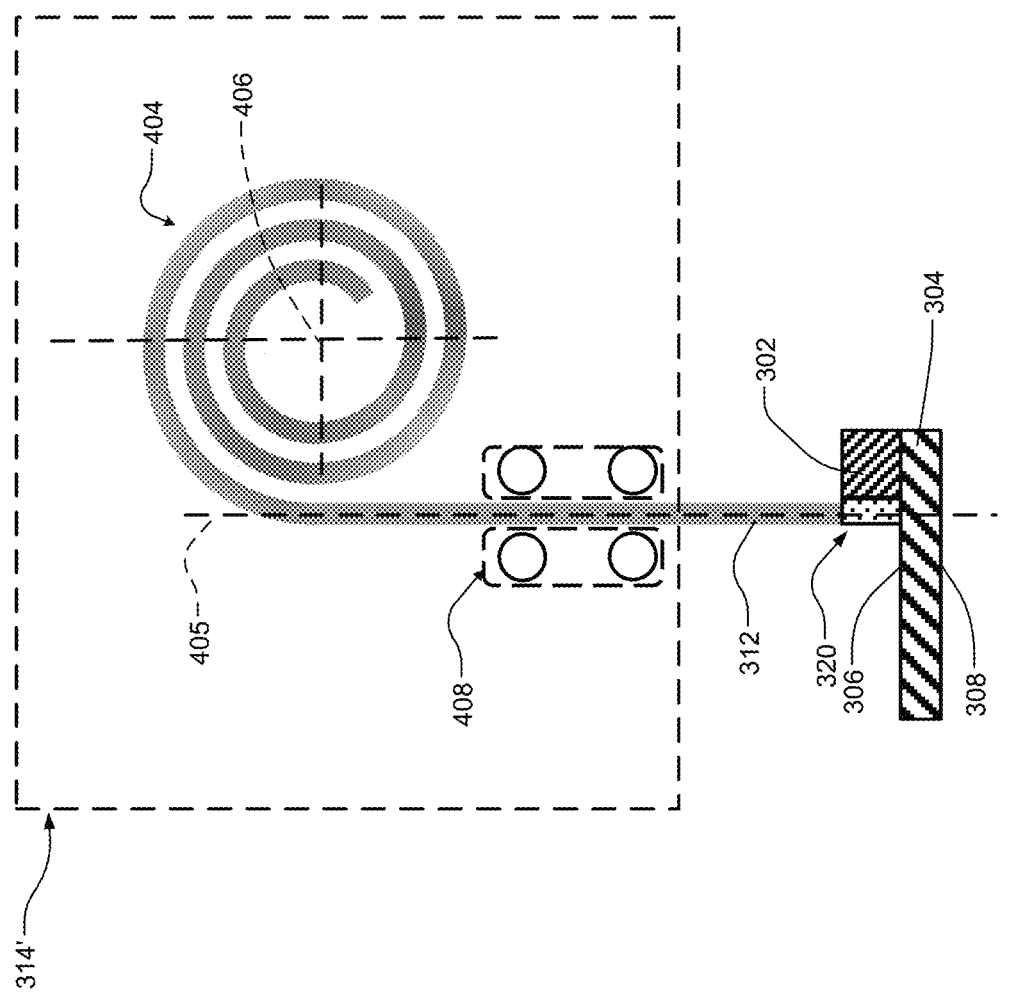
FIG. 4 is a partial schematic illustration of the apparatus of FIG. 3A including an electrode material station according to various aspects of the present disclosure.

In various aspects, providing the solid electrode material 312 includes unfurling the solid electrode material 312 from a roll of the solid electrode material 312. With reference to FIG. 4, an electrode material station or zone 314' for providing the solid electrode material 312 according to various aspects of the present disclosure is provided. In certain aspects, providing the solid electrode material 312 includes unfurling the solid electrode material 312 from a roll 404. The solid electrode material 312 may be unfurled along a depositing axis 405 that is substantially parallel to a central axis 406 (into the page as shown in FIG. 4) of the roll 404. In certain aspects, a conveyor system 408 moves (e.g., translates) the solid electrode material 312 from the roll 404 to an interface region 320 adjacent to the first surface 306 of the substrate 304. Although only one roll of solid electrode material 312 is shown in FIG. 4, providing the solid electrode material may include unfurling the solid electrode material 312 from more than one roll at one or both of the surfaces 306, 308.

In certain aspects, the solid electrode material 312 has an average thickness that is greater than or equal to about 0.2 mm, optionally greater than or equal to about 0.3 mm, optionally greater than or equal to about 0.4 mm, optionally greater than or equal to about 0.5 mm, optionally greater than or equal to about 0.6 mm, optionally greater than or equal to about 0.7 mm, optionally greater than or equal to about 0.8 mm, or optionally greater than or equal to about 0.9 mm. The average thickness may be less than or equal to about 1 mm, optionally less than or equal to about 0.9 mm, optionally less than or equal to about 0.8 mm, optionally less than or equal to about 0.7 mm, optionally less than or equal to about 0.6 mm, optionally less than or equal to about 0.5 mm, optionally less than or equal to about 0.4 mm, or optionally less than or equal to about 0.3 mm.

In certain aspects, the method includes determining a speed of translation of the conveyor system 408 based on a relative translation speed of the substrate 304, the thickness of the solid electrode material 312 of the roll 404, and a desired thickness of the electrode 302. In certain aspects, in addition to moving the solid electrode material 312, the conveyor system 408 is configured to unfurl and/or flatten the solid electrode material 312. The conveyor system 408 may include any quantity of belts, rollers, mechanical grips, and/or other suitable components for moving the solid electrode material 312. In certain aspects, the conveyor system 408 is double-sided with the solid electrode material disposed between a pair of belts and/or rollers, as shown. In other configurations, the conveyor system 408 may be present on a single side of the solid electrode material 312 (not shown).

Figure 5:
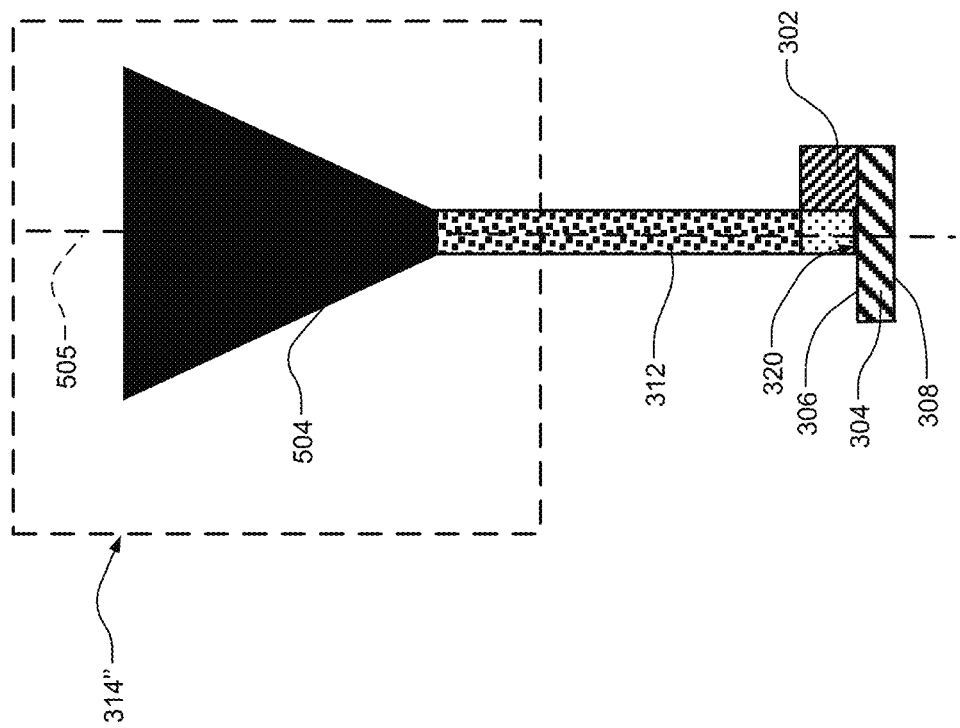
FIG. 5 is a partial schematic illustration of the apparatus of FIG. 3A including another electrode material station according to various aspects of the present disclosure.

In various aspects, providing the solid electrode material 312 includes providing a powder and/or particulate material including the solid electrode material 312. With reference to FIG. 5, an electrode material station or zone 314 for providing the solid electrode material 312 according to various aspects of the present disclosure is provided. In certain aspects, the solid electrode material 312 includes a powder. In certain aspects, the powder has an average particle size that is greater than or equal to about 20 µm, optionally greater than or equal to about 50 µm, optionally greater than or equal to about 100 µm, or optionally greater than or equal to about 150 µm. In certain aspects, the powder has an average particle size that is less than or equal to about 200 µm, optionally less than or equal to about 150 µm, optionally less than or equal to about 100 µm, or optionally less than or equal to about 50 µm.

In certain aspects, providing the solid electrode material 312 includes discharging the solid electrode material 312 from a hopper 504 onto the substrate 304. In certain aspects, providing the solid electrode material 312 includes releasing the solid electrode material 312 from the hopper 504 along a depositing axis 505. In certain aspects, providing the solid electrode material 312 includes releasing the solid electrode material 312 via a gravity feed (i.e., gravity facilitates the movement of the powdered solid electrode material 312 from the hopper 504 to one or both of the surfaces 306, 308 of the substrate 304 when the powdered solid electrode material 312 is released from the hopper 504). In certain aspects, the method includes determining a speed of providing and/or releasing the solid electrode material 312 based on the relative translation speed of the substrate 304 and the desired thickness of the electrode 302.

Figure 6:
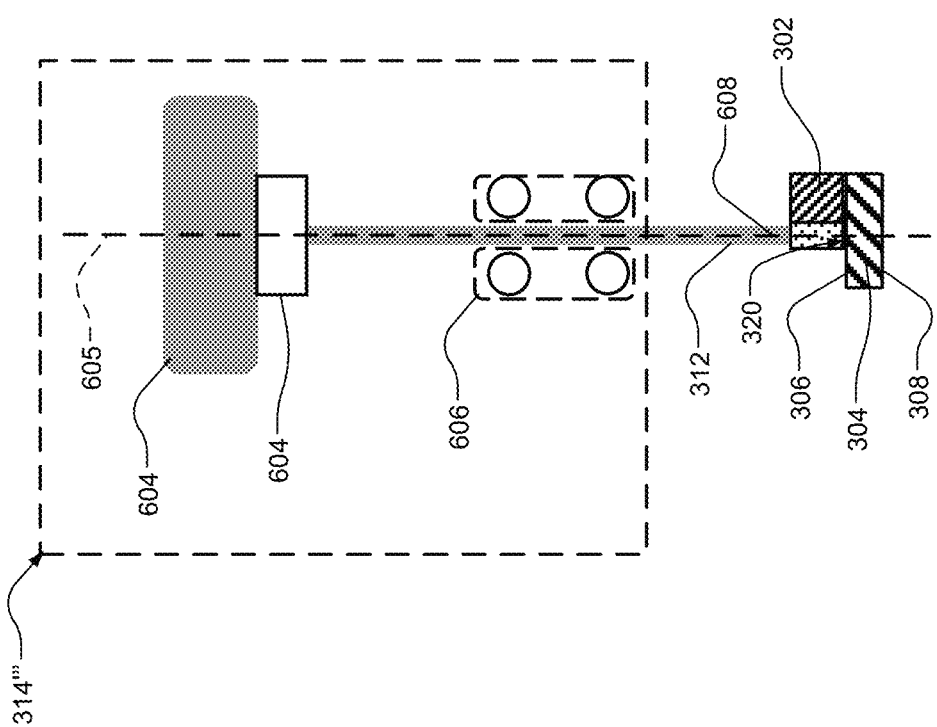
FIG. 6 is a partial schematic illustration of the apparatus of FIG. 3A including another electrode material station according to various aspects of the present disclosure.

In various aspects, providing the solid electrode material 312 includes extruding the solid electrode material 312. With reference to FIG. 6, an electrode material station or zone 314" for providing the solid electrode material 312 according to various aspects of the present disclosure is provided. In certain aspects, providing the solid electrode material 312 includes extruding the solid electrode material 312 via an extruder 602. In certain aspects, the solid electrode material 312 is extruded from an ingot 604. In certain aspects, the solid electrode material 602 is extruded from the ingot 604 via the extruder 602 along an extrusion axis 605. In certain aspects, the solid electrode material 312 is extruded at a speed that is greater than or equal to about 8 g/min, optionally greater than or equal to about 50 g/min, optionally greater than or equal to about 100 g/min, optionally greater than or equal to about 300 g/min, optionally greater than or equal to about 500 g/min, optionally greater than or equal to about 1 kg/min, optionally greater than or equal to about 2.5 kg/min, optionally greater than or equal to about 5 kg/min, optionally greater than or equal to about 7.5 kg/min, or optionally greater than or equal to about 10 kg/min. In certain aspects, the solid electrode material 312 is extruded at a speed that is less than or equal to about 15 kg/min, optionally less than or equal to about 10 kg/min, optionally less than or equal to about 7.5 kg/min, optionally less than or equal to about 5 kg/min, optionally less than or equal to about 2.5 kg/min, optionally less than or equal to about 1 kg/min, optionally less than or equal to about 500 g/min, optionally less than or equal to about 300 g/min, optionally less than or equal to about 100 g/min, or optionally less than or equal to about 50 g/min.

In certain aspects, a conveyor system 606 is configured to move (e.g., translate) the extruded solid electrode material 312 from the extruder 602 to the interface region 320 adjacent to one or both of the surfaces 306, 308 of the substrate 304. The conveyor system 606 may be the same as or similar to the conveyor system 408 of FIG. 4. In certain aspects, the solid electrode material 312 is moved along a depositing axis 608. The depositing axis 608 may be parallel to the extrusion axis 605.

Figure 7:
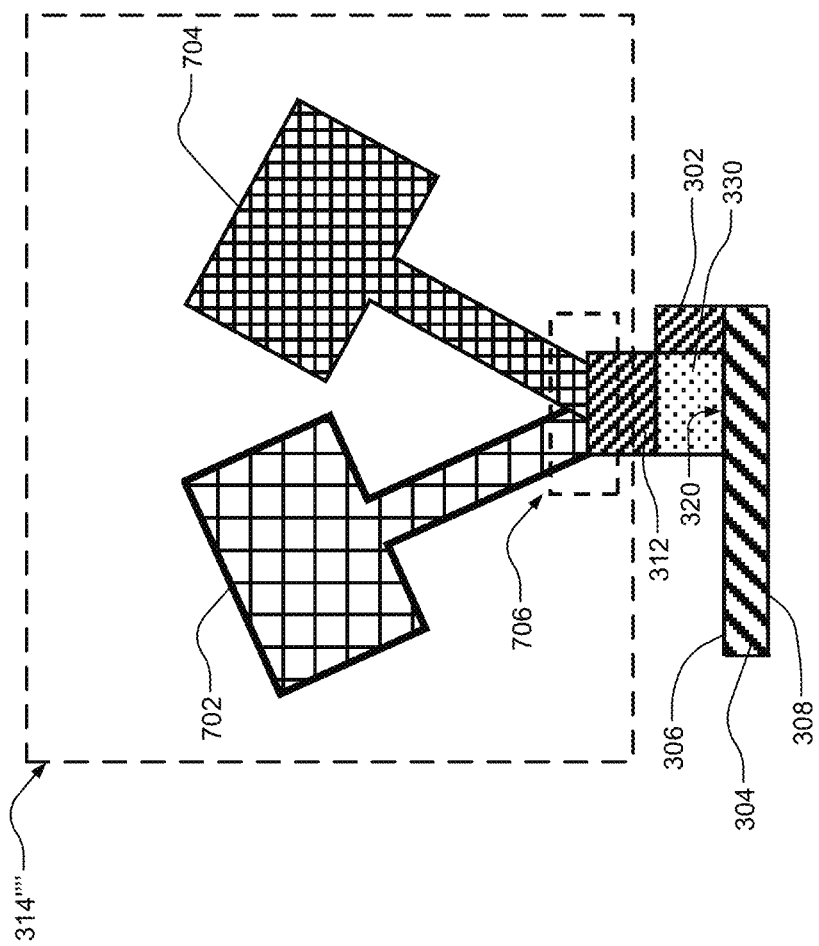
FIG. 7 is a partial schematic illustration of the apparatus of FIG. 3A including another electrode material station according to various aspects of the present disclosure.

In various aspects, providing the solid electrode material 312 includes combining a first precursor and a second precursor. With reference to FIG. 7, an electrode material station or zone 314''' for providing the solid electrode material 312 according to various aspects of the present disclosure is provided. The solid electrode material 312 may include a first precursor material 702 and a second precursor material 704. In certain aspects, the first precursor material 702 is different from the second precursor material 704. In certain aspects, at 206 (FIG. 2), the method includes admixing the first precursor material 702 and the second precursor material 704 at a mixing station or zone 706. The mixing station 706 may be upstream of or at the interface region 320.

Contacting the Solid Electrode Material and the Substrate

Referring to FIGS. 3A-3B, in various aspects, at 206 (FIG. 2), the method includes contacting the solid electrode material 312 and the substrate 304 at the interface region 320. More specifically, the solid electrode material 312 may be placed into direct contact with one or both of the surfaces 306, 308. In certain aspects, each of the solid electrode materials 312 may contact the substrate at a distinct interface region 320, as shown in FIG. 3A. In certain aspects, the interface regions 320 includes one or both of the surfaces 306, 308.

In certain aspects, contacting the solid electrode material 312 and the substrate 304 includes applying the solid electrode material 312 to the substrate 304 at a desired pressure. In certain aspects, the pressure is greater than or equal to about 0.5 psi to less than or equal to about 5 psi. In certain aspects, the pressure is greater than or equal to about 1 psi, optionally greater than or equal to about 1.5 psi, optionally greater than or equal to about 2 psi, optionally greater than or equal to about 2.5 psi, optionally greater than or equal to about 3 psi, greater than or equal to about 3.5 psi, optionally greater than or equal to about 4 psi, or optionally greater than or equal to about 4.5 psi. In certain aspects, the pressure is less than or equal to about 5 psi, optionally less than or equal to about 4.5 psi, optionally less than or equal to about 4 psi, optionally less than or equal to about 3.5 psi, optionally less than or equal to about 3 psi, optionally less than or equal to about 2.5 psi, optionally less than or equal to about 2 psi, optionally less than or equal to about 1.5 psi, or optionally less than or equal to about 1 psi.

Preparing a Liquid Electrode Material

With reference to FIGS. 3A and 3C, in various aspects, at 208 (FIG. 2), the method includes preparing a liquid electrode material 330 at the interface region 320. In various aspects, the method includes heating a portion of the solid electrode material 312 within a heating station or zone 332

(FIG. 3A). In certain aspects, the solid electrode material 312 is melted into the liquid electrode material 330 at the heating zone 332. In various aspects, the portion of the solid electrode material 312 is heated to a first temperature that is greater than or equal to a melting point of the solid electrode material 312. In certain aspects, the first temperature may be greater than or equal to about 240° C. to less than or equal to about 350° C. In certain aspects, the first temperature may be greater than or equal to about 240° C., optionally greater than or equal to about 250° C., optionally greater than or equal to about 260° C., optionally greater than or equal to about 270° C., optionally greater than or equal to about 280° C., optionally greater than or equal to about 290° C., optionally greater than or equal to about 300° C., optionally greater than or equal to about 310° C., optionally greater than or equal to about 320° C., optionally greater than or equal to about 330° C., or optionally greater than or equal to about 340° C. In certain aspects, the first temperature may be less than or equal to about 350° C., optionally less than or equal to about 340° C., optionally less than or equal to about 330° C., optionally less than or equal to about 320° C., optionally less than or equal to about 310° C., optionally less than or equal to about 300° C., optionally less than or equal to about 290° C., optionally less than or equal to about 280° C., optionally less than or equal to about 270° C., optionally less than or equal to about 260° C., or optionally less than or equal to about 250° C.

In certain aspects, heating the portion of the solid electrode material 312 includes directly heating the solid electrode material 312. In certain other aspects, heating the portion of the solid electrode material 312 includes indirectly heating the portion of the solid electrode material 312, such as via the substrate 304, prior to or concurrently with contacting the solid electrode material 312 with the substrate 304 at 206 (FIG. 2). In certain aspects, indirectly heating the portion of the solid electrode material 312 includes directly heating a portion of the substrate 304. In certain aspects, indirectly heating the portion of the solid electrode material 312 includes directly heating the portion of the substrate 304 prior to contacting the solid electrode material 312 with the substrate 304 at 206 (FIG. 2). In certain aspects, heating the portion of the solid electrode material 312 includes directly heating both the portion of the solid electrode material 312 and the portion of the substrate 304.

Heating the portion of the solid electrode material 312 may include different methods, such as those described in greater detail below in the discussions accompanying FIGS. 8-11 or any other suitable method. In certain aspects, heating the portion of the solid electrode material 312 may include heating the substrate 304 via hot rollers (FIG. 8), infrared ("IR") radiation (FIG. 9), hot gas, such as hot argon gas (FIG. 10), a laser (FIG. 11), resistance heating, or combinations thereof.

Figure 8:
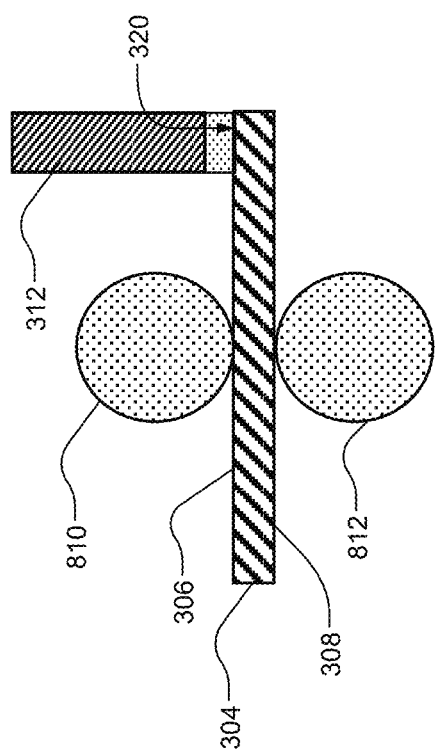
FIG. 8 is a partial schematic illustration of the apparatus of FIG. 3A including a heating station according to various aspects of the present disclosure.

In various aspects, the solid electrode material 312 is indirectly heated via the substrate 304. In certain aspects, the substrate 304 is directly heated via hot rollers. Referring to FIG. 8, a method of heating a portion of the solid electrode material 312 according to the various aspects of the present disclosure is provided. In certain aspects, a first hot roller 810 and a second hot roller 812 (also referred to as "the hot rollers 810, 812") are configured to heat the substrate 304. Additionally or alternatively, the hot rollers 810, 812 may directly heat the solid electrode material 312. In certain aspects, the first hot roller 810 contacts the substrate 304 and is disposed adjacent to the first surface 306. In certain aspects, the second hot roller 812 contacts the substrate 304 and is disposed adjacent to the second surface 308. Although two hot rollers are shown in FIG. 8, in certain aspects, the heating of the solid electrode material may include only one hot roller contacting only one of the surfaces 306, 308. In certain aspects, the heating of the solid electrode material may include more than two hot rollers contacting one or both of the surfaces 306, 308. In certain aspects, the hot rollers 810, 812 heat the substrate 304 prior to the contacting of the solid electrode material at the interface region 320. In certain aspects, the substrate 304 is configured to transfer heat to the solid electrode material at the interface region 320. In certain aspects, the solid electrode material 312 is heated to the first temperature and melts into the liquid electrode material 330 when the solid electrode material 312 contacts the substrate 304 at the interface region 320.

Figure 9:
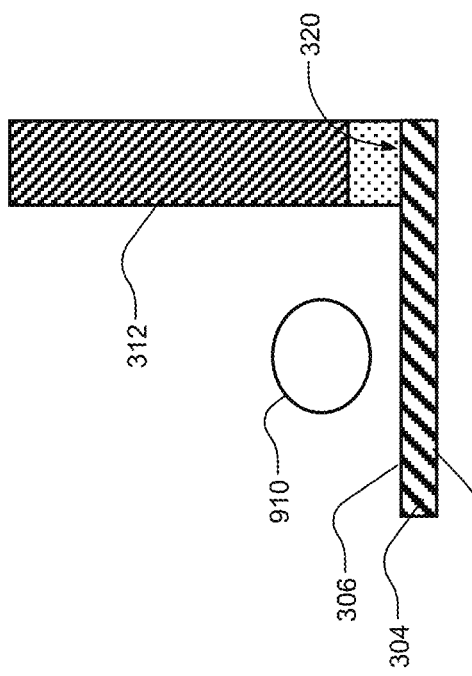
FIG. 9 is a partial schematic illustration of the apparatus of FIG. 3A including another heating station according to various aspects of the present disclosure.

In various aspects, the substrate 304 and/or the solid electrode material 312 are heated via IR radiation. Referring to FIG. 9, a method of heating a portion of the solid electrode material 312 is provided. In certain aspects, heating the solid electrode material 312 includes heating the substrate 304 by directing a source of IR radiation 910 at the first surface 306 of the substrate 304. Additionally or alternatively, the source of IR radiation 910 may directly heat the solid electrode material 312. Although only one source of IR radiation is shown in FIG. 9, the heating of the substrate 304 may include directing more than one IR radiation source at one or both of the surfaces 306, 308. In certain aspects, the source of IR radiation 910 is positioned at a distance that is greater than or equal to about 2 inches to less than or equal to about 8 inches from one or both of the surfaces 306, 308 of the substrate 304. In certain aspects, the source of IR radiation 910 includes a heated bar and/or plate. In certain aspects, the heated bar is heated via a liquid. In certain aspects, the heated bar is heated via resistance heating. In certain aspects, the substrate 304 is configured to absorb energy emitted from the source of IR radiation 910 prior to the contacting of the solid electrode material 312 at the interface region 320. In certain aspects, the substrate 304 is configured to transfer the heat to the solid electrode material at the interface region 320. In certain aspects, the solid electrode material 312 is heated to the first temperature and melts into the liquid electrode material 330 when the solid electrode material 312 contacts the substrate 304 at the interface region 320.

In various aspects, the substrate 304 and/or the solid electrode material 312 are heated via hot gas. Referring to FIG. 10, a method of heating the solid electrode material 312 is provided. In certain aspects, heating the solid electrode material 312 includes heating the substrate 304 by directing a source of hot gas 1010 (e.g., argon gas) at the first surface 306 of the substrate 304. Additionally or alternatively, the hot gas 1010 may directly heat the solid electrode material. Although only one source of hot argon gas is shown in FIG. 10, the heating of the substrate 304 may include directing more than one source of hot gas at one or both of the surfaces 306, 308. In certain aspects, the substrate 304 is heated prior to the contacting of the solid electrode material 312 at the interface region 320. In certain aspects, the substrate 304 is configured to absorb heat from the source of hot gas 1010. In certain aspects, the substrate 304 is configured to transfer the absorbed heat to the solid electrode material 312 at the interface region 320. In certain aspects, the solid electrode material 312 is heated to the first temperature and melts into the liquid electrode material 330 when the solid electrode material 312 contacts the substrate 304 at the interface region 320.

In various aspects, the substrate 304 and/or the solid electrode material 312 are heated via laser irradiation. Referring to FIG. 11, a method of heating the solid electrode material 312 is provided. In certain aspects, heating the solid electrode material 312 includes heating the substrate 304 by directing a laser 1110 at the first surface 306 of the substrate 304. Additionally or alternatively, the laser 1110 may directly heat the solid electrode material 312. In certain aspects, the laser 1110 provides a concentrated energy source capable of heating the substrate 304. In certain aspects, the laser 1110 emits a laser beam (not shown) that is directed towards the first surface 306 of the substrate 304. Although only one laser is shown in FIG. 11, heating of the substrate 304 may include directing more than one laser at one or both of the surfaces 306, 308. In certain aspects, the substrate 304 is heated prior to the contacting of the solid electrode material 312 at the interface region 320. The substrate 304 is configured to absorb energy from the laser beam and transfer the heat to the solid electrode material 312 at the interface region 320. In certain aspects, the solid electrode material 312 is heated to the first temperature and melts into the liquid electrode material 330 when the solid electrode material 312 contacts the substrate 304 at the interface region 320.

In various aspects, the substrate 304 and/or the solid electrode material 312 are heated via resistance heating. In certain aspects, one or more resistive heating elements are configured to heat the substrate 304. Additionally or alternatively, the resistive heating elements may directly heat the solid electrode material 312. In certain aspects, resistive heating elements are incorporated into rollers (see, e.g., the rollers 342 of FIG. 3) and are disposed adjacent to one or both of the surfaces 306, 308. In certain aspects, the rollers contact one or both of the surfaces 306, 308 and heat the substrate 304. In certain aspects, the resistance heating includes directing heat generated in a plate including the resistive heating elements towards one or both of the surfaces 306, 308 of the substrate 304. In certain aspects, the resistance heating includes contacting the substrate 304 and/or solid electrode material 312 with power (e.g., an electrical current) from an external circuit. In certain aspects, the current is subject to electrical resistance from the substrate 304 and produces thermal energy (i.e., the substrate 304 includes the resistive heating elements).

Creating a Layer of the Liquid Electrode Material

Referring to FIGS. 3A and 3D-3E, in various aspects, at 210 (FIG. 2), the method includes creating a layer 340 (FIGS. 3D-3E) of the liquid electrode material 330 on the substrate 304. In various aspects, the layer 340 of the liquid electrode material 330 is created by moving at least one of the solid electrode material 312 and the substrate 304 with respect to the other of the solid electrode material 312 and the substrate 304 while the liquid electrode material 330 contacts the substrate 304 such that the liquid electrode material 330 is spread onto the substrate 304. In one example, creating the layer at 210 includes moving exactly one of the substrate 304 and the solid electrode material 312 while fixing a position of the other of the substrate 304 and the solid electrode material 312. In another example, creating the layer at 210 includes moving both of the substrate 304 and the solid electrode material 312 at different speeds and/or in different directions to achieve relative motion between the substrate 304 and the solid electrode material 312.

The substrate 304 may be moved with respect to the solid electrode material 312, as shown. In certain aspects, one or more rollers 342 and/or another conveyor frictionally engage the substrate 304 to translate the substrate. In certain aspects, the rollers 342 (FIG. 3A) are in direct contact with the substrate 304. Although FIG. 3A shows the rollers 342 disposed adjacent the second surface 308, the rollers may be disposed adjacent to one or both of the surfaces 306, 308.

In certain aspects, the rollers 342 cooperate to move (e.g., translate) the substrate 304 in a translation direction 344 with respect to the solid electrode material 312 (i.e., the rollers 342 move the substrate 304 in the translation direction 344 and the solid electrode material 312 is stationary). In certain aspects, a relative speed between the substrate 304 and the solid electrode material 312 (e.g., a speed of the substrate 304 while the solid electrode material 312 remains stationary) is greater than or equal to about 1 m/min to less than or equal to about 1800 m/min. In certain aspects, the relative speed between the substrate 304 and the solid electrode material 312 is greater than or equal to about 1 m/min, optionally greater than or equal to about 50 m/min, optionally greater than or equal to about 100 m/min, optionally greater than or equal to about 250 m/min, optionally greater than or equal to about 500 m/min, optionally greater than or equal to about 1000 m/min, optionally greater than or equal to about 1250 m/min, or optionally greater than or equal to about 1500 m/min. In certain aspects, the relative speed between the substrate 304 and the solid electrode material is less than or equal to 1800 m/min, optionally less than or equal to about 1500 m/min, optionally less than or equal to about 1250 m/min, optionally less than or equal to about 1000 m/min, optionally less than or equal to about 500 m/min, optionally less than or equal to about 250 m/min, optionally less than or equal to about 250 m/min, optionally less than or equal to about 100 m/min, or optionally less than or equal to about 50 m/min. In one example, the relative speed between the substrate 304 and the solid electrode material 312 is greater than or equal to about 1 m/min to less than or equal to about 50 m/min. In another example, the relative speed between the substrate 304 and the solid electrode material 312 is greater than or equal to about 50 m/min to less than or equal to about 60 m/min. In another example, the relative speed between the substrate 304 and the solid electrode material 312 is greater than or equal to about 60 m/min to less than or equal to about 600 m/min. In another example, the relative speed between the substrate 304 and the solid electrode material 312 is greater than or equal to about 600 m/min to less than or equal to about 1000 m/min. In another example, the relative speed between the substrate 304 and the solid electrode material 312 is greater than or equal to about 1000 m/min to less than or equal to about 1800 m/min.

The speed of relative movement between the substrate 304 and the solid electrode material 312 may affect the thickness and/or surface roughness of the electrode 302. In certain aspects, increasing the speed of the substrate 304 decreases the thickness of the electrode 302. In certain aspects, decreasing the speed of the substrate 304 increases the thickness of the electrode 302.

Forming an Electrode

With reference to FIGS. 3A and 3F, in various aspects, at 212 (FIG. 2), the method includes forming the electrode 302 by cooling the liquid electrode material 330 at a cooling station or zone 350 (FIG. 3A). In certain aspects, the electrode 302 may be a negative electrode. In certain aspects, the negative electrode may be a lithium metal electrode. In certain aspects, forming at 212 may include forming a portion of an electrode, such as a forming a layer of an electrode or as pre-lithiation of an electrode.

In certain aspects, the liquid electrode material 330 is cooled to a second temperature less than or equal to a melting point of the liquid electrode material 330. In certain aspects, the liquid electrode material is cooled to the second temperature and forms the electrode 302. In certain aspects, the second temperature is greater than or equal to about 40° C. to less than or equal to about 200° C. In certain aspects, the second temperature is greater than or equal to about 40° C., optionally greater than or equal to about 100° C., optionally greater than or equal to about 110° C., optionally greater than or equal to about 120° C., optionally greater than or equal to about 130° C., optionally greater than or equal to about 140° C., optionally greater than or equal to about 150° C., optionally greater than or equal to about 160° C., or optionally greater than or equal to about 170° C. In certain aspects, the second temperature is less than or equal to about 200° C., optionally less than or equal to about 180° C., optionally less than or equal to about 170° C., optionally less than or equal to about 160° C., optionally less than or equal to about 150° C., optionally less than or equal to about 140° C., optionally less than or equal to about 130° C., optionally less than or equal to about 120° C., or optionally less than or equal to about 110° C.

In certain aspects, the liquid electrode material 330 is cooled to the second temperature at a rate that is greater than or equal to about 100° C./s to less than or equal to about 200° C./s. In certain aspects, the rate is greater than or equal to about 100° C./s, optionally greater than or equal to about 125° C./s, optionally greater than or equal to about 150° C./s, or optionally greater than or equal to about 175° C./s. In certain aspects, the rate is less than or equal to about 200° C./s, optionally less than or equal to about 175° C./s, optionally less than or equal to about 150° C./s, or optionally less than or equal to about 125° C./s. In certain aspects, cooling includes quenching the liquid electrode material 330.

In certain aspects, cooling liquid electrode material 330 at the cooling zone 350 includes directing a cold plate at the liquid electrode material 330. In certain aspects, the cold plate is configured to cool the liquid electrode material 330. In certain aspects, the cold plate is cooled via a heat pump.

In certain aspects, the liquid electrode material 330 is cooled at the cooling zone 350 via cold rollers. In certain aspects, the cold rollers are configured to cool the liquid electrode material 330. In certain aspects, the cold rollers are configured to directly cool the liquid electrode material 330. Additionally or alternatively, the cold rollers may directly cool the substrate 304 and the liquid electrode material 330 is indirectly cooled. In certain aspects, the cold rollers may contact the liquid electrode material 330 and decrease the temperature of the liquid electrode material 330 to the second temperature.

In various aspects, a thickness 380 of the electrode 302 may be tailored to meet the desired characteristics of the electrode. In certain aspects, the thickness 380 of the electrode 302 is tailored through the speed of relative movement between the substrate 304 and the solid electrode material 312, the rate of cooling, and/or the use of rollers (e.g., cold rollers). In certain aspects, the electrode 302 has an average thickness that is greater than or equal to about 1 μm to less than or equal to about 200 μm. In certain aspects, the electrode 302 has an average thickness that is greater than or equal to about 1 μm, optionally greater than or equal to about 5 μm, optionally greater than or equal to about 10 μm, optionally greater than or equal to about 15 μm, optionally greater than or equal to about 20 μm, optionally greater than or equal to about 25 μm, optionally greater than or equal to about 30 μm, optionally greater than or equal to about 50 μm, optionally greater than or equal to about 75 μm, optionally greater than or equal to about 100 μm, optionally greater than or equal to about 125 μm, optionally greater than or equal to about 150 μm, or optionally greater than or equal to about 175 μm. In certain aspects, the electrode 302 has an average thickness that is less than or equal to about 200 μm, optionally less than or equal to about 175 μm, optionally less than or equal to about 150 μm, optionally less than or equal to about 125 μm, optionally less than or equal to about 100 μm, optionally less than or equal to about 75 μm, optionally less than or equal to about 50 μm, optionally less than or equal to about 30 μm, optionally less than or equal to about 25 μm, optionally less than or equal to about 20 μm, optionally less than or equal to about 15 μm, or optionally less than or equal to about 10 μm. In certain aspects, such as when the electrode 302 is configured to be a precursor for pre-lithiation of an anode, the thickness 380 of the electrode 302 is greater than or equal to about 2 μm to less than or equal to about 5 μm. In certain aspects, the thickness 380 of the electrode 302 is greater than or equal to about 5 μm to less than or equal to about 30 μm. In certain aspects, a combined thickness of the electrodes 302 and the substrate 304 is greater than or equal to about 50 μm to less than or equal to about 100 μm.

In certain aspects, the electrode 302 has an average surface roughness that is greater than or equal to about 0.5 μm, optionally greater than or equal to about 1 μm, optionally greater than or equal to about 2 μm, optionally greater than or equal to about 3 μm, or optionally greater than or equal to about 4 μm. In certain aspects, the electrode 302 has an average surface roughness that is less than or equal to about 5 μm, optionally less than or equal to about 4 μm, optionally less than or equal to about 3 μm, optionally less than or equal to about 2 μm, or optionally less than or equal to about 1 μm.

In various aspects, a crystal size and/or morphology of the electrode 302 is tailored by the rate of cooling. In certain aspects, directing a laser at the layer 340 and/or liquid electrode material 330 facilitates a desired cooling rate. The laser may be the same as or different from the laser 1110 of FIG. 11. In certain aspects, the laser provides a concentrated energy source capable of cooling the liquid electrode material 330 and/or partially formed electrode 302. In certain aspects, the laser emits a laser beam that is directed towards the liquid electrode material 330. In one example, providing energy via the laser to the electrode 302 as the liquid electrode material 330 cools may increase the amount of time it takes to decrease the liquid electrode material 330 from a temperature at the contacting (e.g., the contacting 206 of FIG. 2) to the second temperature (e.g., decrease the cooling rate). An electrode formed with an increased cooling time (e.g., decreased cooling rate) may have an increased crystal size compared to an electrode having a relatively decreased cooling time (e.g., increased cooling rate).

In certain aspects, as shown in FIG. 3A, electrodes 302 may be formed on both of the surfaces 306, 308 of the substrate 304. In certain aspects, the substrate 304 is disposed between the electrodes 302. Although FIG. 3A shows formation of electrodes 302 on both of the surfaces 306, 308, in certain aspects, the method may include forming an electrode on only one of the surfaces 306, 308.

In certain aspects, the electrode 302 may be a negative electrode (e.g., the negative electrode 22 of FIG. 1). In certain aspects, the negative electrode may be a lithium metal electrode.

Treating the Electrode

With continued reference to FIG. 3A, in certain aspects, at 214 (FIG. 2), the method optionally includes treating the electrodes 302 at a treatment station or zone 370. Treating the electrodes 302 may include physically and/or chemically modifying at least a portion of the electrodes 302, which may be substantially the entire electrodes 302. In certain aspects, treating the electrodes 302 includes applying a surface coating, as described above in the discussion of FIG. 1. In certain aspects, treating the electrodes 302 may include providing a cover gas, laser treating, rolling, any other suitable treatment, or combinations thereof.

In certain aspects, treating the electrodes 302 includes providing the electrodes 302 with a cover gas. The cover gas may include carbon dioxide ($CO_2$), fluorine ($F_2$), oxygen ($O_2$), nitrogen ($N_2$), sulfur (S), phosphine ($PH_3$), or combinations thereof. In certain aspects, treating the electrodes 302 includes directing a source of cover gas at a surface 372 of the electrodes 302. In certain aspects, the cover gas contacts the surfaces 372 of the electrodes 302. In certain aspects, treating the electrodes 302 with the cover gas forms a passivation layer on the surfaces 372 of the electrodes 302. The passivation layer may be configured to stabilize the surfaces 372 of the electrodes 302. In certain aspects, the electrode 302 having a stabilized surface 372 may exhibit fewer undesirable chemical reactions compared to an electrode that was not treated with a cover gas. In certain aspects, the passivation layer may include lithium carbonate, lithium fluoride, lithium oxide, lithium nitride, lithium sulfide, lithium phosphide, or combinations thereof. In one example, contacting the surface 372 with $CO_2$ forms a passivation layer including lithium carbonate. In certain aspects, the passivation layer has an average thickness that is less than or equal to about 1 μm.

In certain aspects, treating the electrodes 302 includes directing a laser at the surfaces 372 of the electrodes 302. In certain aspects, the laser is configured to clean the surfaces 372. In certain aspects, the cleaning may reduce or eliminate debris that may be present on the surfaces 372. Accordingly, after treating the electrodes 302 at 214, the surfaces 372 may be substantially free of debris. An electrode having a surface that is substantially free of debris and/or has reduced debris may facilitate improved/increased adhesion of other components in an electrochemical cell compared to an electrode having a surface having a relatively higher amount of debris. Additionally or alternatively, an electrode having a surface that is substantially free of debris may facilitate improved/increased electrical conductivity between the electrode and other components of the electrochemical cell compared to an electrode having a surface having a relatively higher amount of debris.

In certain aspects, treating the electrodes 302 includes rolling the surfaces 372 of the electrodes 302. In certain aspects, a roller is disposed on the surface 372. In certain aspects, the roller contacts the surface 372. In certain aspects the roller directly contacts the surface 372. In certain aspects, a pressure is applied to the roller and the roller is moved (e.g., translated) with respect to the surface 372. In certain aspects, rolling the surfaces 372 of the electrodes 302 tailors the surface characteristics (e.g., surface roughness) and/or the thickness 380 of the electrodes 302. In certain aspects, rolling facilitates the formation of an electrode having a substantially uniform thickness. Accordingly, after treating the electrodes 302 at 214, the electrodes 302 may have a substantially uniform thickness. In certain aspects, an electrode that is treated via rolling has a more uniform thickness compared to an electrode that has not been treated via rolling.

Adding a Discrete Layer

In certain aspects, at 216 (FIG. 2), the method optionally includes adding a discrete layer (e.g., an interleaf layer) to a surface of the electrode 302. The interleaf layer may be disposed on top of the electrode 302 adjacent to the surface 372. The electrode 302 may be wound into a roll and/or cut and stacked in layers for storage and/or transport, The interleaf layer may be disposed between adjacent portions of the electrode 302 or layers of the electrode 302. In certain aspects, the interleaf layer includes any material suitable to reduce or prevent adhesion (e.g., sticking) between adjacent portions of the electrode 302, adjacent layers of electrodes 302, and/or protect the electrode 302 from external contamination. In certain aspects, the interleaf layer includes a polymer. In certain aspects, the interleaf layer includes a polyethylene (PE), a polypropylene (PP), a polyethylene terephthalate (PET), co-polymers thereof, or combinations thereof.

Removing a Portion of the Substrate

In certain aspects, at 218 (FIG. 2), the method optionally includes removing at least a portion of the substrate 304 from the electrode 302. In certain aspects, removing may include lifting and/or peeling a portion of the substrate 304 from the electrode 302. In certain aspects, removing may include cutting a portion of the substrate 304 from the electrode 302.

Assembling an Electrochemical Cell Including the Electrode

In certain aspects, at 220 (FIG. 2), the method optionally includes assembling an electrochemical cell including the electrode 302. The electrochemical cell may be the same as or similar to the lithium-ion battery 20 as described in greater detail in the discussion accompanying FIG. 1, above. In certain aspects, the electrode 302 includes lithium metal and the electrochemical cell is a lithium metal electrochemical cell, such as a lithium metal battery. In certain aspects, the electrode 302 is a portion of an electrode and is configured to pre-lithiate the electrode, such as when the electrode is an anode including silicon.

Apparatuses for Fabricating the Electrode

Figure 13:
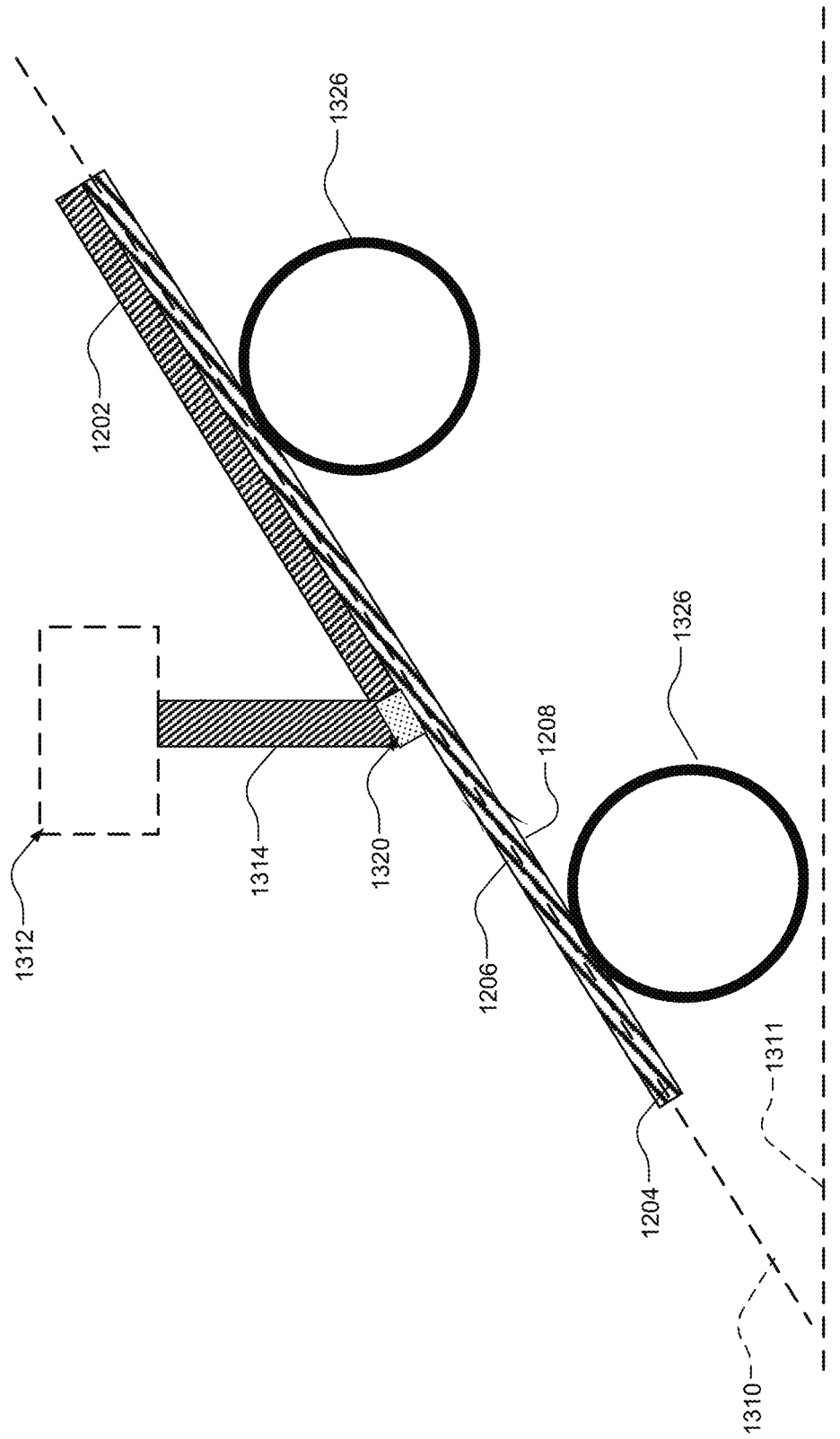
FIG. 13 is another schematic illustration of another alternative apparatus for manufacturing an electrode according to the method of FIG. 2.

According to various aspects of the present disclosure, the method of fabricating an electrode may be performed on an apparatus having different configurations depending on space and other processing requirements, such as those described in greater detail below in the discussion accompanying FIGS. 3A and 12-13 or any other suitable configuration. The substrate is oriented at an angle with respect to the ground. The angle may be about 0° such that the substrate is substantially parallel to the ground or horizontal (FIG. 3A), about 90° such that the substrate is substantially perpendicular to the ground or substantially vertical (FIG. 12), or at an angle between 0° and 90° (FIG. 13).

In various aspects, the substrate is oriented in a substantially vertical direction. With reference to FIG. 12, an apparatus for manufacturing electrodes 1202 according to various aspects of the present disclosure is provided. A substrate 1204 including a first surface 1206 and a second surface 1208 is provided. In certain aspects, the substrate 1204 is oriented in a plane 1210 that is perpendicular to a plane 1211 of the ground. In certain aspects, the substrate 1204 is oriented at an angle that is about 90° with respect to the plane 1211 of the ground. In certain aspects, the substrate 1204 is substantially vertical. Except for the orientation of the substrate 1204, the apparatus and its method of use are the same as the apparatus of FIG. 3A.

In certain aspects, the apparatus includes a providing zone 1212 for providing a solid electrode material 1214. In certain aspects, the solid electrode material 1214 contacts the substrate 1204 at an interface region 1220. In certain aspects, one or more rollers 1226 cooperate to move the substrate 1204 with respect to the solid electrode material 1214, such as in a translating direction that is parallel to the plane 1210. The apparatus also includes a heating zone and a cooling zone, such as those described in FIG. 3A. In certain aspects, the apparatus may include a treating zone for treating the substrate 1204 and/or a treating zone for treating the electrodes 1202, such as those described in FIG. 3A.

In various aspects, the substrate is oriented at an angle with respect to the ground. With reference to FIG. 13, an apparatus for manufacturing an electrode 1302 according to various aspects of the present disclosure is provided. A substrate 1304 including a first surface 1306 and a second surface 1308 is provided. In certain aspects, the substrate 1304 is oriented in a plane 1310 that has an angle between 0° and 90° with respect to a plane 1311 of the ground. In certain aspects, the angle is greater than or equal to about 30° to less than or equal to about 60°. In certain aspects, the angle is greater than or equal to about 40° to less than or equal to about 50°. Except for the orientation of the substrate 1304, the apparatus and its method of use are the same as the apparatus of FIG. 3A.

In certain aspects, the apparatus includes a providing zone 1312 for providing a solid electrode material 1314. In certain aspects, one or more rollers 1326 cooperate to move the substrate 1304 with respect to the solid electrode material 1314, such as in a translating direction that is parallel to the plane 1310. The apparatus also includes a heating zone and a cooling zone, such as those described in FIG. 3A. In certain aspects, the apparatus may include a treating zone for treating the substrate 1304 and/or a treating zone for treating the electrode 1302, such as those described in FIG. 3A.

Example

Figure 14A:
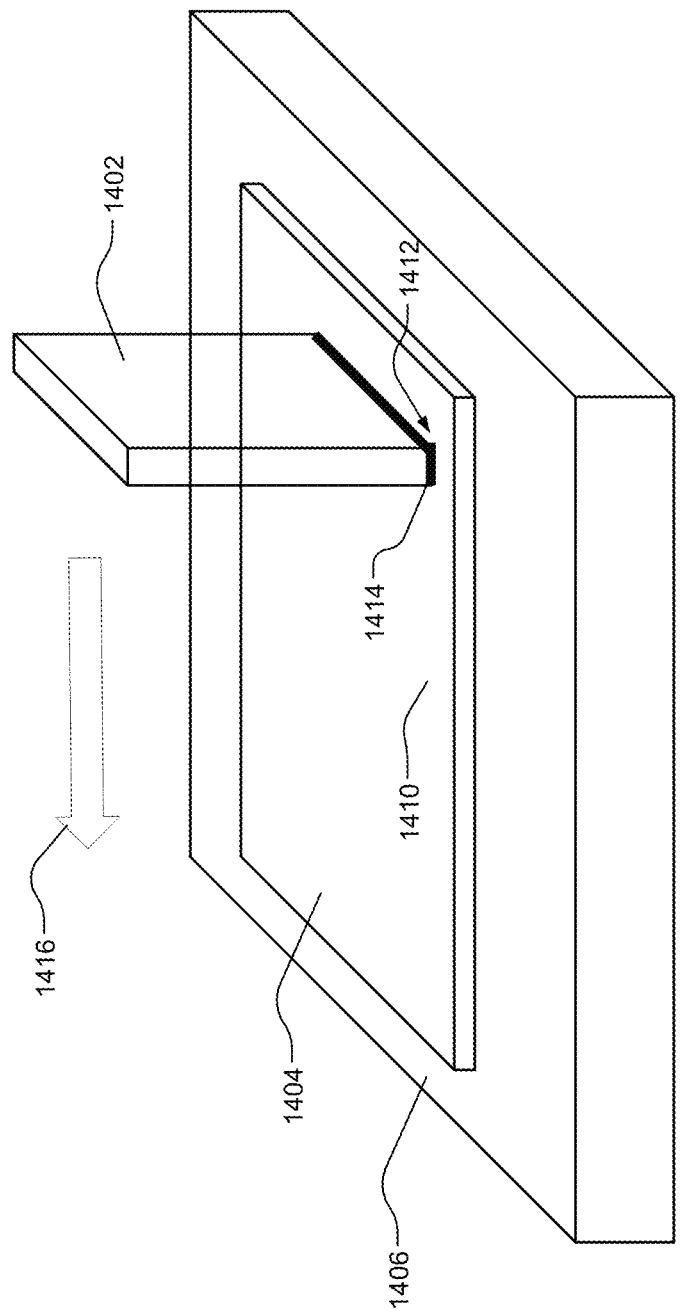

Referring to FIG. 14A, an electrode 1400 is prepared according to various aspects of the present disclosure. A solid electrode material 1402 includes lithium metal. A substrate 1404 including copper foil is disposed on a heating plate 1406. The heating plate 1406 is heated to a temperature that is greater than or equal to about 240° C. to less than or equal to about 260° C. Thermal energy from the heating plate 1406 generates heat in the substrate 1404.

The solid electrode material 1402 is held by a pair of tweezers (not shown) and directly contacted with a surface 1410 of the substrate 1404 at an interface region 1412. When the solid electrode material 1402 contacts the heated substrate 1404, the solid electrode material 1402 melts into liquid electrode material 1414 (i.e., molten lithium) at the interface region 1412. The pair of tweezers apply a constant pressure and move the solid electrode material 1402 with respect to the substrate 1404 in a direction 1416. A layer (not shown) of liquid electrode material 1414 is formed on the surface 1410 of the substrate 1404. The liquid electrode material 1414 is cooled to form the electrode 1400 including lithium metal.

With reference to FIG. 14B, a photograph of the electrode 1400 is shown. The electrode 1400 is disposed on the surface 1410 of the substrate 1404.

With reference to FIGS. 14C-14D, SEM photographs of a cross-section of the electrode 1400 of FIG. 14B is shown. As best shown in FIG. 14C, the electrode 1400 has a thickness 1450 that is about 90 µm. As best shown in FIG. 14D, the substrate 1404 has a thickness 1452 of about 8 µm.

What is claimed is:

1. A method of manufacturing an electrode for an electrochemical cell, the method comprising:
   contacting a solid electrode material and a substrate at an interface;
   preparing a liquid electrode material at the interface by heating at least a portion of the solid electrode material to a first temperature greater than or equal to a melting point of the solid electrode material;
   creating a layer of the liquid electrode material on the substrate by moving at least one of the solid electrode material and the substrate with respect to the other of the solid electrode material and the substrate; and
   forming the electrode by cooling the liquid electrode material to a second temperature less than or equal to the melting point.

2. The method of claim 1, wherein the solid electrode material includes lithium.

3. The method of claim 2, wherein the solid electrode material is a lithium metal electrode.

4. The method of claim 1, further comprising, prior to the contacting, providing the solid electrode material.

5. The method of claim 4, wherein the providing includes unfurling the solid electrode material from a roll, extruding the solid electrode material, providing a powder comprising the solid electrode material, or a combination thereof.

6. The method of claim 4, wherein the providing includes preparing the solid electrode material by combining a first precursor and a second precursor.

7. The method of claim 1, wherein the heating includes directly heating the solid electrode material.

8. The method of claim 1, wherein the creating includes translating the substrate with respect to the solid electrode material via a pair of rollers.

9. The method of claim 1, further comprising separating at least a portion of the electrode from the substrate.

10. The method of claim 1, wherein the substrate comprises an electrically-conductive material configured to be a current collector or an electrically-insulating material configured to be a solid-state electrolyte.

11. The method of claim 1, wherein the substrate comprises an electroactive material, and the forming creates a precursor for pre-lithiation of the electroactive material.

12. The method of claim 1, wherein the contacting includes contacting a first electrode material and the substrate at a first interface and contacting a second electrode material and the substrate at a second interface, the substrate being at least partially disposed between the first electrode material and the second electrode material.

13. The method of claim 1, further comprising, after the forming, disposing an interleaf layer on a surface of the electrode.

14. The method of claim 1, wherein the electrode has an average thickness that is greater than or equal to about 10 micrometers to less than or equal to about 30 micrometers.

15. The method of claim 1, wherein
the first temperature is greater than or equal to about 240° C., and
the second temperature is greater than or equal to about 25° C. to less than or equal to about 180° C.

16. The method of claim 1, wherein the heating includes hot rolling, infrared (IR) radiating, providing hot argon gas, laser irradiating, resistance heating, or combinations thereof.

17. The method of claim 1, further comprising, prior to the contacting, treating the substrate, the treating including cleaning, laser ablating, providing a gas, acid washing, thermal treating, depositing wetting material, or combinations thereof.

18. The method of claim 1, the method further comprising, after the forming, treating a surface of the electrode, the treating including providing a cover gas, laser treating, rolling, or combinations thereof.

19. A method of manufacturing a lithium metal electrode, the method comprising:
contacting a solid electrode material and a substrate at an interface;
preparing a liquid electrode material at the interface by heating at least a portion of the solid electrode material to a first temperature greater than or equal to a melting point of the solid electrode material;
creating a layer of the liquid electrode material on the substrate by moving at least one of the solid electrode material and the substrate with respect to the other of the solid electrode material and the substrate; and
forming the electrode by cooling the liquid electrode material to a second temperature less than or equal to the melting point.

* * * * *